US012668082B2

(12) United States Patent (10) Patent No.: US 12,668,082 B2
Yamamoto et al. (45) Date of Patent: Jun. 30, 2026

(54) NONWOVEN BODY AND TIRE

(71) Applicant: BRIDGESTONE CORPORATION, Tokyo (JP)

(72) Inventors: Masahiko Yamamoto, Tokyo (JP); Yoshihide Kouno, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 377 days.

(21) Appl. No.: 18/564,207

(22) PCT Filed: Mar. 16, 2022

(86) PCT No.: PCT/JP2022/012091
§ 371 (c)(1),
(2) Date: Nov. 27, 2023

(87) PCT Pub. No.: WO2022/259682
PCT Pub. Date: Dec. 15, 2022

(65) Prior Publication Data
US 2024/0246361 A1 Jul. 25, 2024

(30) Foreign Application Priority Data
Jun. 10, 2021 (JP) ................................. 2021-097608

(51) Int. Cl.
*B60C 7/06* (2006.01)
*B60C 7/18* (2006.01)
(52) U.S. Cl.
CPC . *B60C 7/06* (2013.01); *B60C 7/18* (2013.01)

(58) Field of Classification Search
CPC ................ B60C 7/06; B60C 7/16; B60C 7/18
See application file for complete search history.

(56) References Cited

U.S. PATENT DOCUMENTS

| | | | | |
|---|---|---|---|---|
| 1,039,427 A | * | 9/1912 | McCarty | ................... B60C 7/16 |
| | | | | 152/252 |
| 1,159,925 A | * | 11/1915 | Geering | .................... B60C 7/16 |
| | | | | 152/250 |
| 1,168,283 A | * | 1/1916 | Chupka | ..................... B60C 7/18 |
| | | | | 152/262 |
| 1,217,461 A | * | 2/1917 | Kemmerich | .............. B60C 7/16 |
| | | | | 152/312 |
| 7,833,319 B2 | | 11/2010 | Rolf et al. | |
| 8,141,606 B2 | * | 3/2012 | Benzing, II | ............... B60C 7/06 |
| | | | | 152/95 |

(Continued)

FOREIGN PATENT DOCUMENTS

| | | |
|---|---|---|
| CN | 111748913 A | 10/2020 |
| EP | 4159481 A1 | 4/2023 |

(Continued)

OTHER PUBLICATIONS

Jun. 7, 2022, International Search Report issued in the International Patent Application No. PCT/JP2022/012091.

(Continued)

*Primary Examiner* — Jason R Bellinger
(74) *Attorney, Agent, or Firm* — KENJA IP LAW PC

(57) ABSTRACT
A nonwoven body according to the disclosure includes a plurality of metal fibers each having a cross section orthogonal to a longitudinal direction, the cross section having a profile that is convex polygonal.

14 Claims, 27 Drawing Sheets

(56)                  References Cited

U.S. PATENT DOCUMENTS

| | | | | |
|---|---|---|---|---|
| 8,931,531 | B2 * | 1/2015 | Kubeck | B60C 7/18 |
| | | | | 152/88 |
| 10,427,461 | B1 * | 10/2019 | Padula, II | B60C 7/06 |
| 11,845,309 | B2 * | 12/2023 | Kouno | B60C 7/14 |
| 12,227,028 | B2 * | 2/2025 | Kouno | B60B 9/06 |
| 2007/0012612 | A1 | 1/2007 | Verschaeve et al. | |
| 2012/0223497 | A1 * | 9/2012 | Radziszewski | B60C 7/06 |
| | | | | 280/80.1 |
| 2022/0194130 | A1 | 6/2022 | Kouno | |
| 2022/0227174 | A1 * | 7/2022 | Kouno | B60C 7/24 |
| 2024/0270021 | A1 * | 8/2024 | Yamamoto | D01F 9/08 |

FOREIGN PATENT DOCUMENTS

| | | | |
|---|---|---|---|
| JP | 2663290 | B2 | 10/1997 |
| JP | 2001161405 | A | 6/2001 |
| JP | 2005299022 | A | 10/2005 |
| JP | 2006199066 | A | 8/2006 |
| JP | 2007119942 | A | 5/2007 |
| JP | 2008115486 | A | 5/2008 |
| JP | 2008545890 | A | 12/2008 |
| JP | 2020192930 | A | 12/2020 |
| WO | 2010138150 | A2 | 12/2010 |
| WO | 2020241286 | A1 | 12/2020 |

OTHER PUBLICATIONS

Nov. 21, 2023, International Preliminary Report on Patentability issued in the International Patent Application No. PCT/JP2022/012091.

Sep. 11, 2024, search result of the Extended European Search Report issued by the European Patent Office in the corresponding European Patent Application No. 22819872.7.

Jul. 29, 2025, search result of Office Action issued by the China National Intellectual Property Administration in the corresponding Chinese Patent Application No. 202280039942.3.

* cited by examiner

Insertion direction

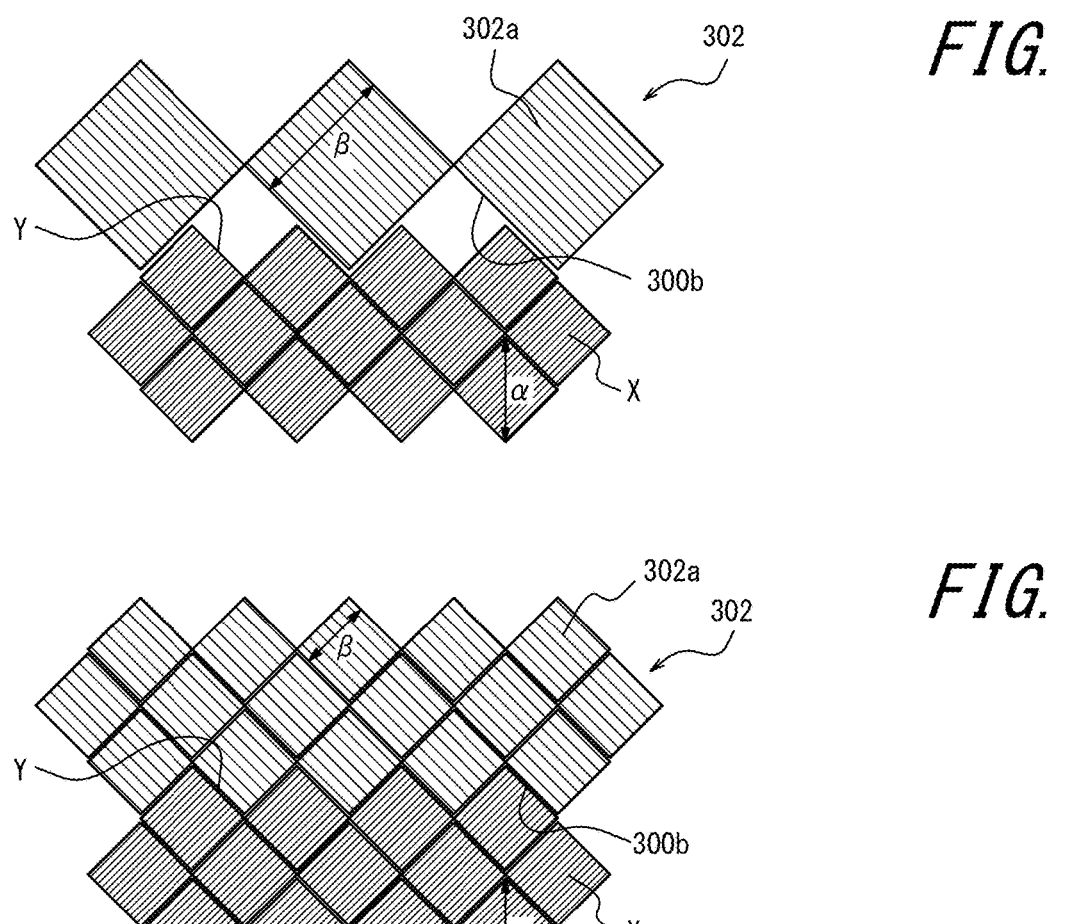
FIG. 14A
FIG. 14B
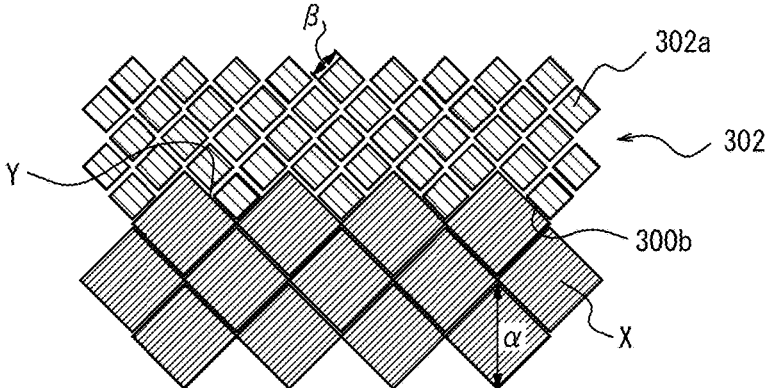
FIG. 14C

Rolling direction

302

302a

Main fiber direction

NONWOVEN BODY AND TIRE

TECHNICAL FIELD

The disclosure relates to a nonwoven body and a tire.

BACKGROUND

Tires including coil springs are conventionally known. For example, Patent Literature (PTL) 1 discloses a tire in which a respective plurality of coil springs are interlaced with other coil springs and secured to annular rims to form a toroidal shape as a whole.

PTL 2 discloses a tire including a skeleton portion and a tread member. The skeleton portion in PTL 2 includes a rim member, a plurality of body springs, and a plurality of interlink springs.

CITATION LIST

Patent Literature

PTL 1: WO 2010/138150
PTL 2: JP 2020-192930

SUMMARY

Technical Problem

In the tire disclosed in PTL 1, a wheel includes springs such as coil springs, and due to existence of a large number of voids between the springs, the tire may not be able to be used as appropriate depending on a running environment. For example, in a case in which the tire disclosed in PTL1 is used on sandy ground or the like, the tire may be buried in the ground due to sand that enters gaps between the coil springs. In addition, sand may enter the center of rotation of the wheel through the gaps between the coil springs and cause an abnormality of a drive mechanism, for example, in a case in which there is a drive mechanism or the like in the center of rotation of the wheel. Accordingly, the tire disclosed in PTL 1 may cause deterioration in desired running performance, such as driving force.

In contrast, the tire disclosed in PTL 2 includes a tread member disposed on the outer periphery of a skeleton portion configured with springs. Therefore, the tire disclosed in PTL 2 can suppress the above deterioration in running performance.

However, the tire disclosed in PTL 2 has further room for improvement in terms of an enhancement in traction performance.

It would be helpful to provide a nonwoven body and a tire that are likely to achieve a tread member that can improve traction performance.

Solution to Problem

A nonwoven body as a first aspect of the disclosure includes a plurality of metal fibers each having a cross section orthogonal to a longitudinal direction, the cross section having a profile that is convex polygonal.

Advantageous Effect

According to the disclosure, it is possible to provide a nonwoven body and a tire that can achieve a tread member that can improve traction performance.

BRIEF DESCRIPTION OF THE DRAWINGS

In the accompanying drawings:

FIG. 3 is an external perspective view of rim members of FIG. 2;

FIG. 4 is a schematic diagram illustrating an example of a body spring that constitutes a grounding deformable portion of FIG. 2;

FIGS. 14A to 14C are diagrams illustrating nonwoven bodies in which the sizes of the cross sectional profiles of the metal fibers are different, and FIGS. 14A to 14C are each a conceptual diagram illustrating a state in which a contact patch of the tread member formed of the nonwoven body illustrated in FIG. 13B is grounded on a road surface on which fine irregularities are formed;

DETAILED DESCRIPTION

Figure 1:
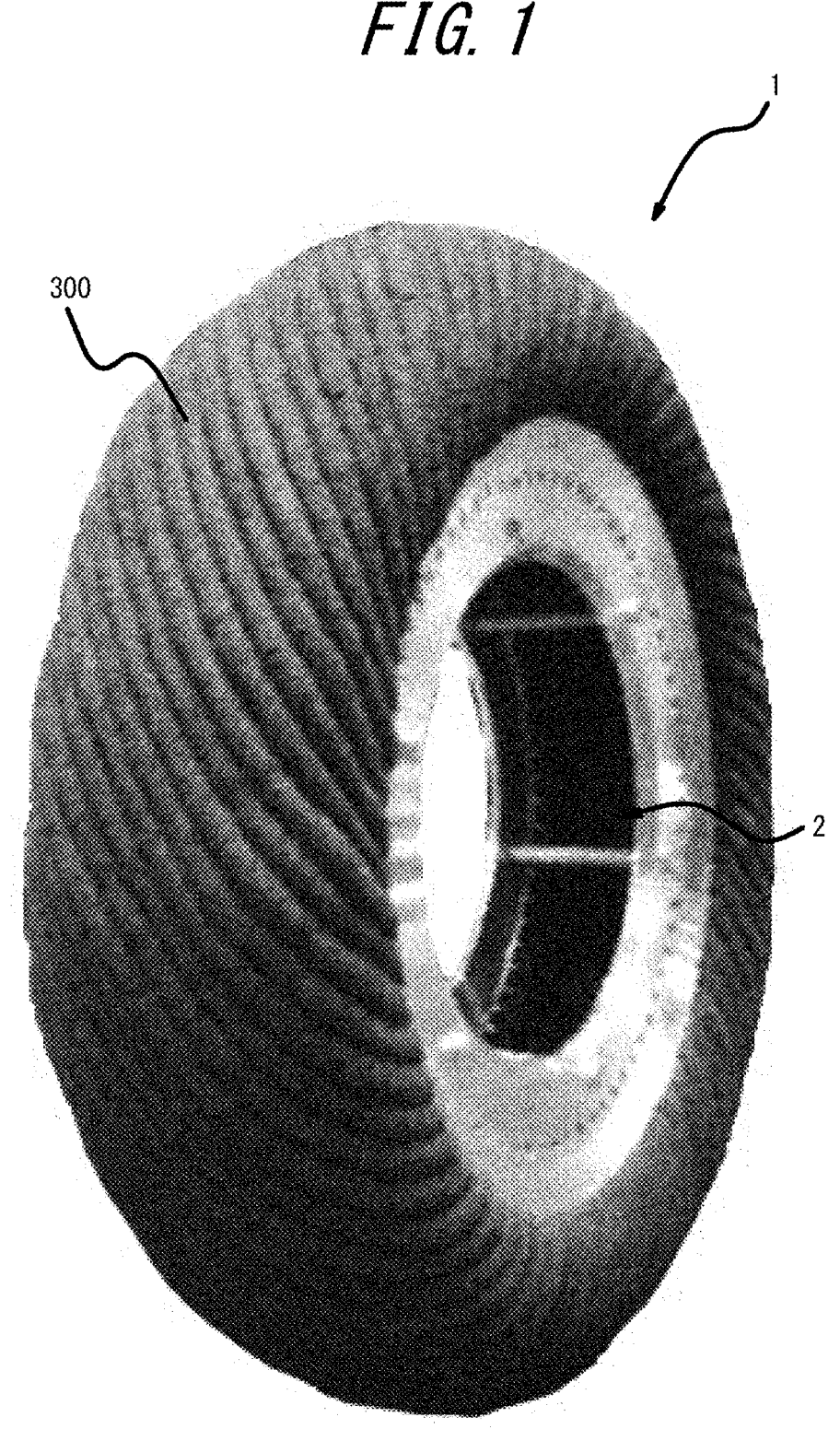
FIG. 1 is an external perspective view of a tire according to an embodiment of the disclosure.

An embodiment of a nonwoven body and a tire according to the disclosure will be exemplarily described below with reference to the drawings. The same components in the drawings are denoted by the same reference numerals. In the present specification, the tire width direction refers to a direction parallel to the rotation axis of the tire. The tire radial direction refers to a radial direction orthogonal to the rotation axis of the tire and centering the rotation axis. The tire circumferential direction refers to a direction in which the tire rotates centering the rotation axis of the tire.

FIG. 1 is an external perspective view of a tire 1 according to an embodiment of the disclosure. The tire 1 according to the present embodiment includes a skeleton portion 2 that defines the structure of the tire 1 and tread members 300 mounted on the skeleton portion 2.

<Skeleton Portion 2>

Figure 2:
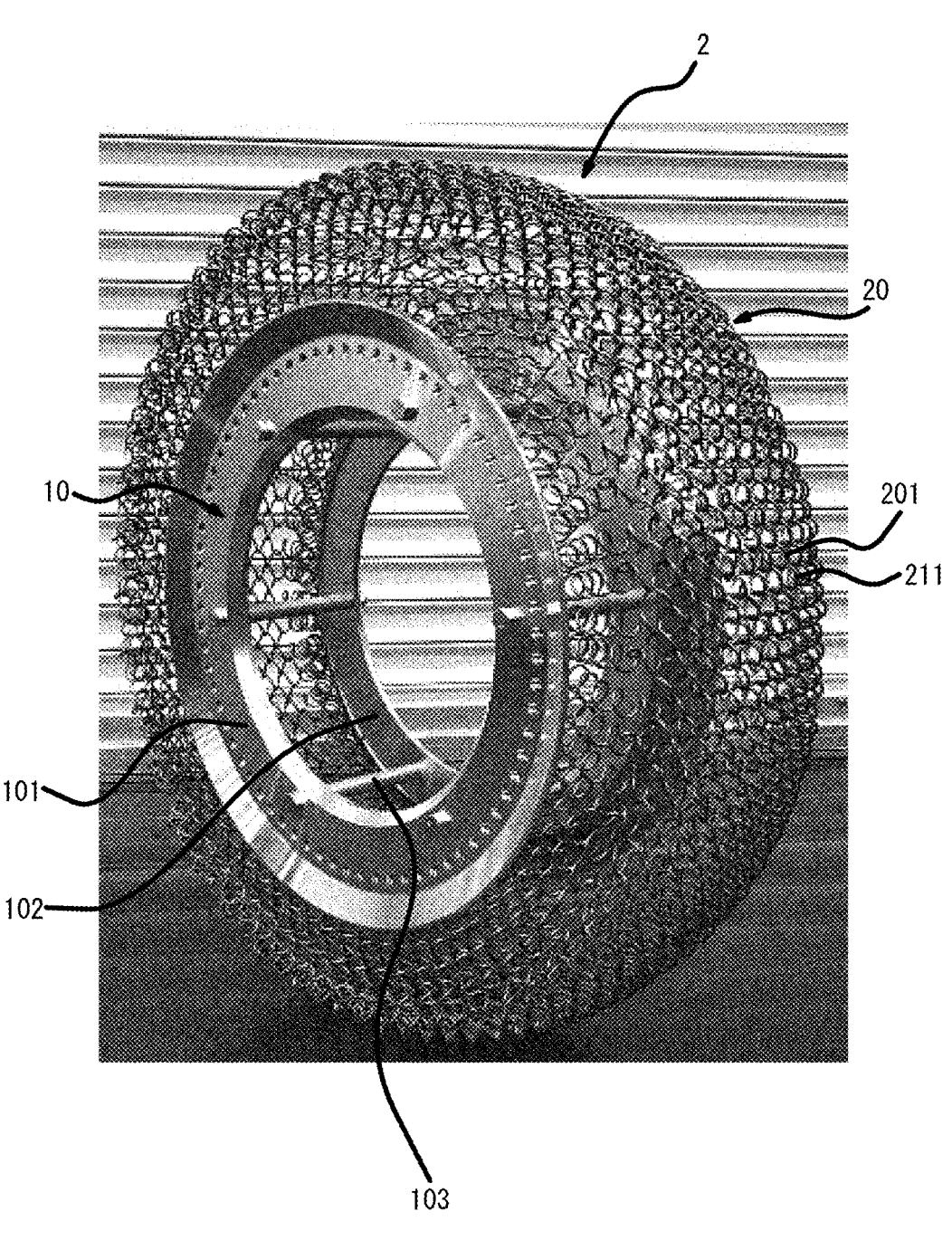
FIG. 2 is an external perspective view of a skeleton portion of the tire of FIG. 1.

FIG. 2 is an external perspective view of the skeleton portion 2 of the tire 1. As illustrated in FIG. 2, the skeleton portion 2 of the tire 1 of the present embodiment includes a wheel portion 10 as a rim member and a grounding deformable portion 20 that is deformable while being grounded.

Figure 3:
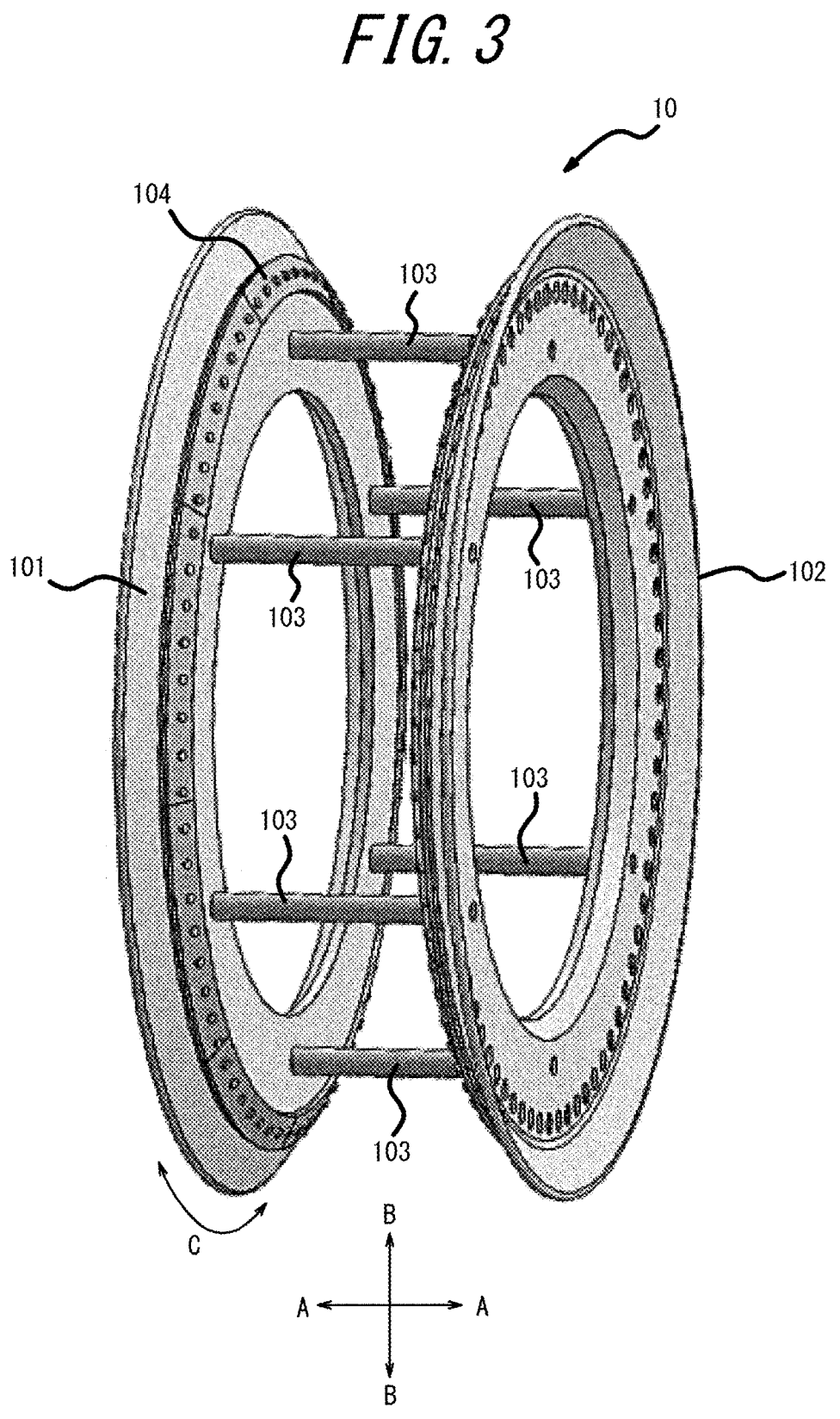

FIG. 3 is an external perspective view of the wheel portion 10 of the skeleton portion 2 of the tire 1. The wheel portion 10 is provided with a plurality of rim portions. As illustrated in FIGS. 2 and 3, the wheel portion 10 of the present embodiment is provided with two rim portions. More specifically, the wheel portion 10 of the present embodiment is provided with a first rim portion 101 and a second rim portion 102. The wheel portion 10 of the present embodiment is further provided with a plurality of connection portions 103 that connect between the first rim portion 101 and the second rim portion 102. The number of the rim portions provided in the wheel portion 10 is not particularly limited. The wheel portion 10 may be provided with, for example, three or more rim portions. A wheel portion provided with three rim portions and a wheel portion provided with four rim portions will be described later (see FIGS. 22 to 24).

The first rim portion 101 and the second rim portion 102 are made of metal or resin. The first rim portion 101 and the second rim portion 102 are each formed in an annular shape. The first rim portion 101 and the second rim portion 102 are disposed at different positions in a tire width direction A so as to have the same central axis. In the present embodiment, the first rim portion 101 and the second rim portion 102 are configured to have the same size and shape. However, as long as the tire 1 can perform functions as a tire, the first rim portion 101 and the second rim portion 102 may be configured in different sizes or shapes. The outer diameter of the first rim portion 101 and the second rim portion 102 may be determined as appropriate according to the size of the tire 1 required.

The connection portions 103 connect between the first rim portion 101 and the second rim portion 102. The connection portions 103 are made of metal or resin. As illustrated in FIG. 3, the wheel portion 10 of the present embodiment is provided with six connection portions 103, but the number of the connection portions 103 provided in the wheel portion 10 is not limited thereto. The plurality of connection portions 103 are each attached to one side of the annular first rim portion 101 and one side of the annular second rim portion 102. This causes the connection portions 103 to be integrated with the first rim portion 101 and the second rim portion 102. In this specification, in the wheel portion 10, the side on which the connection portions 103 are attached to the first rim portion 101 and the second rim portion 102 is referred to as an "inner side in the tire width direction A", and the side on which the connection portions 103 are not attached is referred to as an "outer side in the tire width direction A".

In the present embodiment, the first rim portion 101 and the second rim portion 102 include, in inner surfaces in the tire width direction A, fit receiving portions 105 (see FIG. 6) to which body springs 201 of the grounding deformable portion 20 can be fitted. Details of the fit receiving portions and an aspect of fitting will be described later. In this specification, "fitting" refers to being fitted together, and "latching" refers broadly to being fastened together, including being fitted together.

Figure 6:
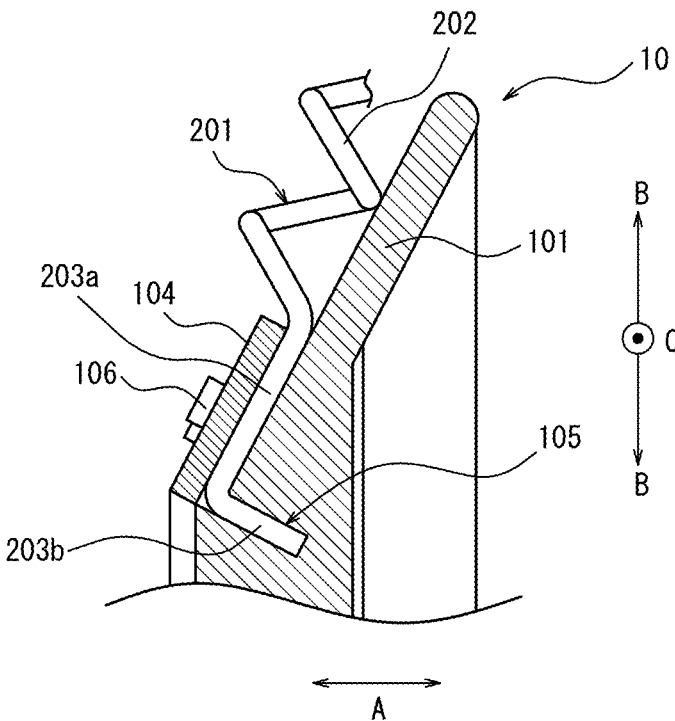
FIG. 6 is a cross sectional view along the line I-I of FIG. 5.

As illustrated in FIG. 3, the wheel portion 10 as the rim member of the present embodiment further includes support members 104 that maintain a state of fitting the grounding deformable portion 20 to the fit receiving portions 105 (see FIG. 6). The support members 104 of the present embodiment are attached to the first rim portion 101 and the second rim portion 102. The support members 104 may be secured to the inner side of the first rim portion 101 and the second rim portion 102 in the tire width direction A using, for example, bolts.

The grounding deformable portion 20 of the present embodiment is configured elastically deformable in a tire radial direction B. As illustrated in FIG. 2, the grounding deformable portion 20 of the present embodiment includes body springs 201 and interlink springs 211. The body springs 201 and the interlink springs 211 are made of metal.

Figure 4:
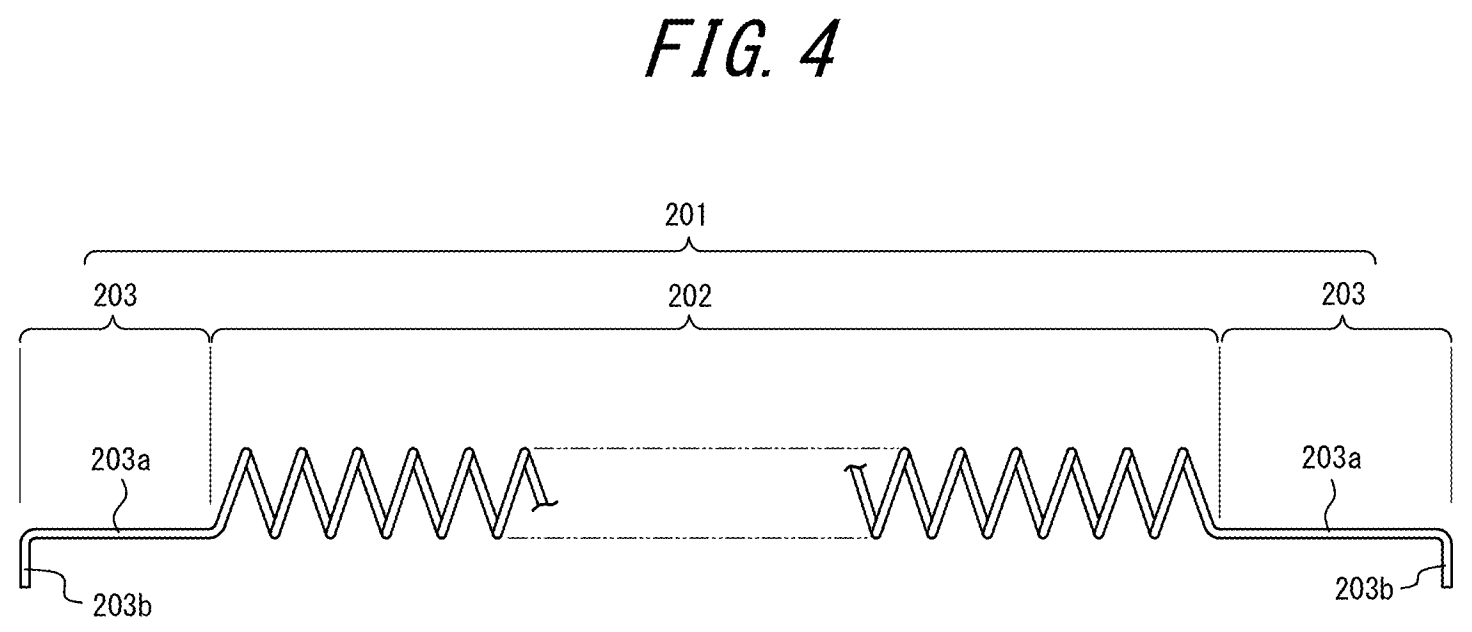
Figure 22:
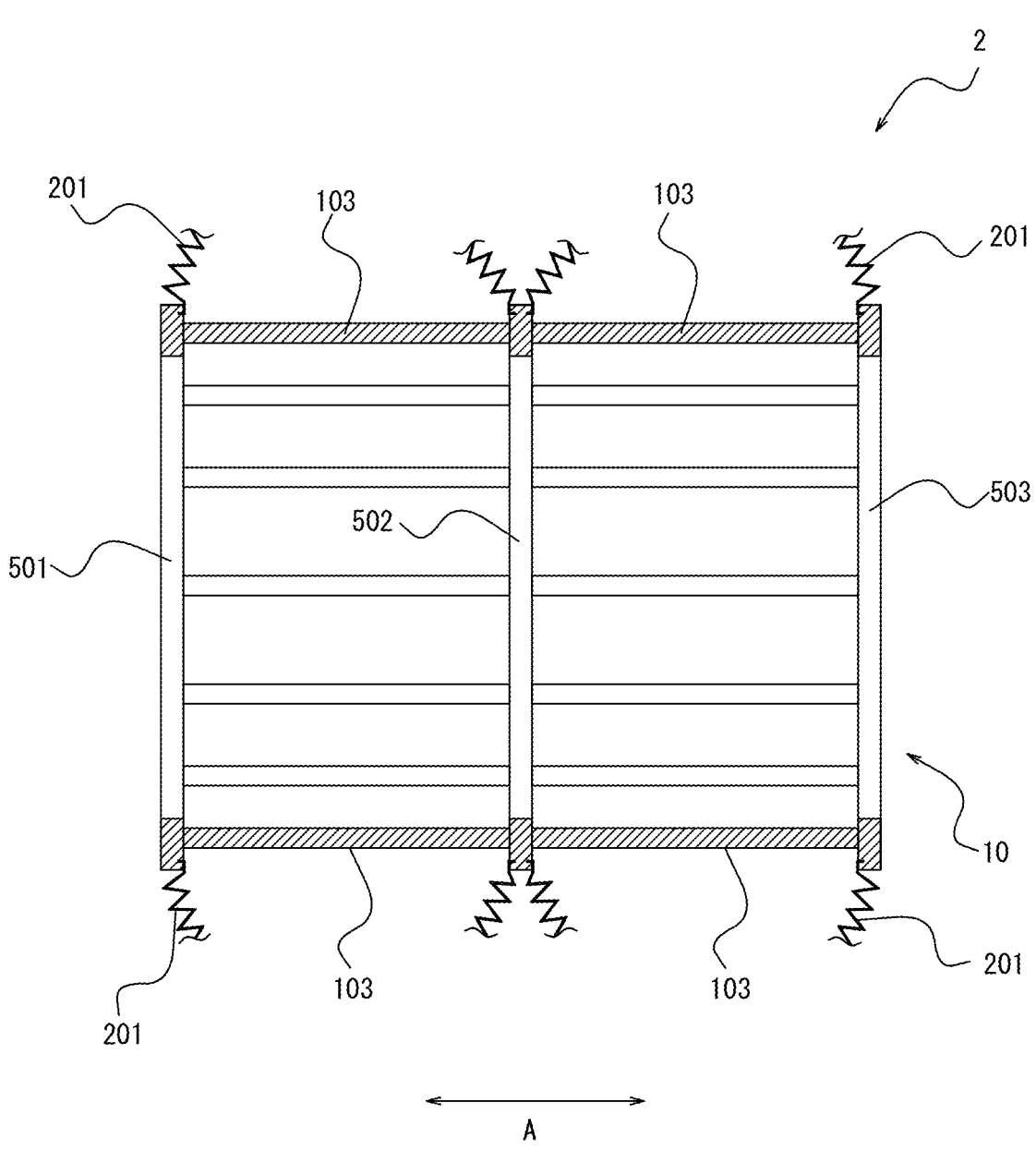
FIG. 22 is a diagram illustrating an example of a rim member including three rim portions.
Figure 24:
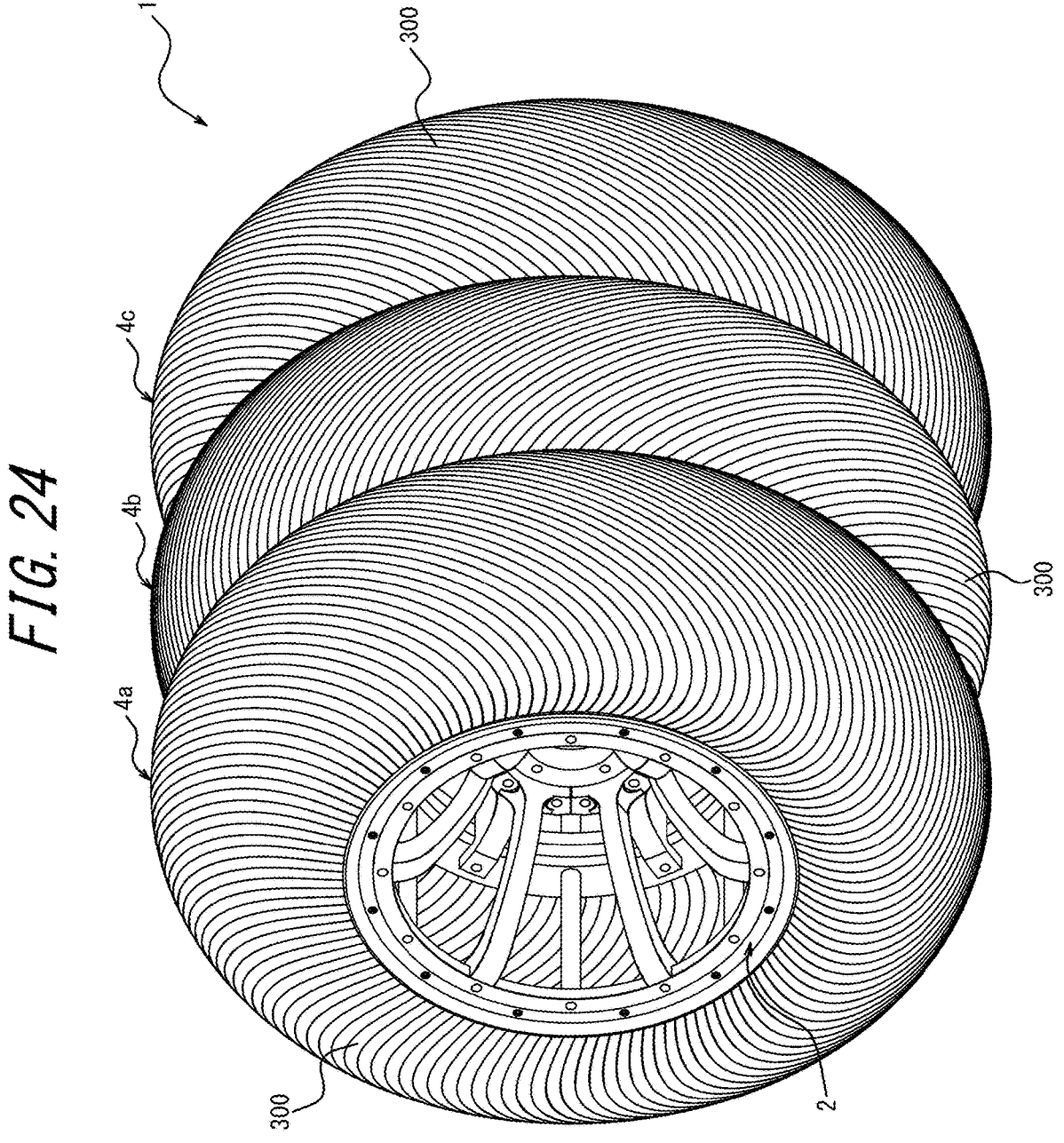
FIG. 24 is a diagram illustrating an example of a tire including four rim portions and three different tread portions.

FIG. 4 is a schematic diagram illustrating an example of the body spring 201 that constitutes the grounding deformable portion 20 illustrated in FIG. 2. The body springs 201 connect between the plurality of rim portions. In the present embodiment, the body springs 201 connect between the first rim portion 101 and the second rim portion 102. FIG. 22 is a diagram illustrating a skeleton portion 2 including three rim portions 501 to 503. As illustrated in FIG. 22, in a case in which the wheel portion 10 as the rim member of the skeleton portion 2 has the three rim portions 501 to 503, it is preferable that the body springs 201 connect between all pairs of two adjacent rim portions out of the three rim portions 501 to 503 in a manner similar to the manner of connecting between the first rim portion 101 and the second rim portion 102 described above. FIG. 24 is a diagram illustrating a skeleton portion 2 including four rim portions. Although the details are not illustrated, also in the example illustrated in FIG. 24, the body springs 201 as in FIG. 22 connect between all pairs of two adjacent rim portions out of the four rim portions. However, the skeleton portion 2 including three or more rim portions may also have a configuration of connecting between at least one pair of any two rim portions.

As illustrated in FIG. 4, the body spring 201 includes an elastic deformable portion 202 and latch portions 203. In the present embodiment, the elastic deformable portion 202 is constituted of a coil spring. Here, the coil spring refers to a spring that deforms elastically in response to a load and is coiled (spirally wound) around a predetermined axis. The elastic deformable portion 202 that is made of a suitable material and has appropriate elasticity can be used according to the size and weight of a desired tire 1, required properties of the grounding deformable portion 20, and the like.

The latch portions 203 are provided at both ends of the elastic deformable portion 202. The latch portions 203 latch the body spring 201 on the wheel portion 10 as the rim member. The latch portions 203 have a different shape from that of the elastic deformable portion 202. That is, in the present embodiment, the latch portions 203 have a shape different from a coil shape.

In the present embodiment, the latch portions 203 are constituted of members integral with the elastic deformable portion 202. As illustrated in FIG. 4, the latch portions 203 of the present embodiment are constituted of extending portions that are parts made by extending a material composing the elastic deformable portion 202 from both ends of the elastic deformable portion 202.

As illustrated in FIG. 4, the latch portions 203 of the present embodiment have straight portions 203a that are continuous with both ends of the elastic deformable portion 202 and extend in a linear shape. Also as illustrated in FIG. 4, the latch portions 203 of the present embodiment include bent portions 203b that are continuous with tip ends opposed to base ends continuous with the elastic deformable portion 202 of the straight portions 203a and are bent with respect to the straight portions 203a. In the present embodiment, the bent portions 203b are bent orthogonally with respect to the straight portions 203a in a side view of the body spring 201 (see FIG. 4). In other words, the bent portions 203b of the present embodiment are bent orthogonally with respect to the straight portions 203a in a plane containing the axis of the body spring 201.

Figure 5:
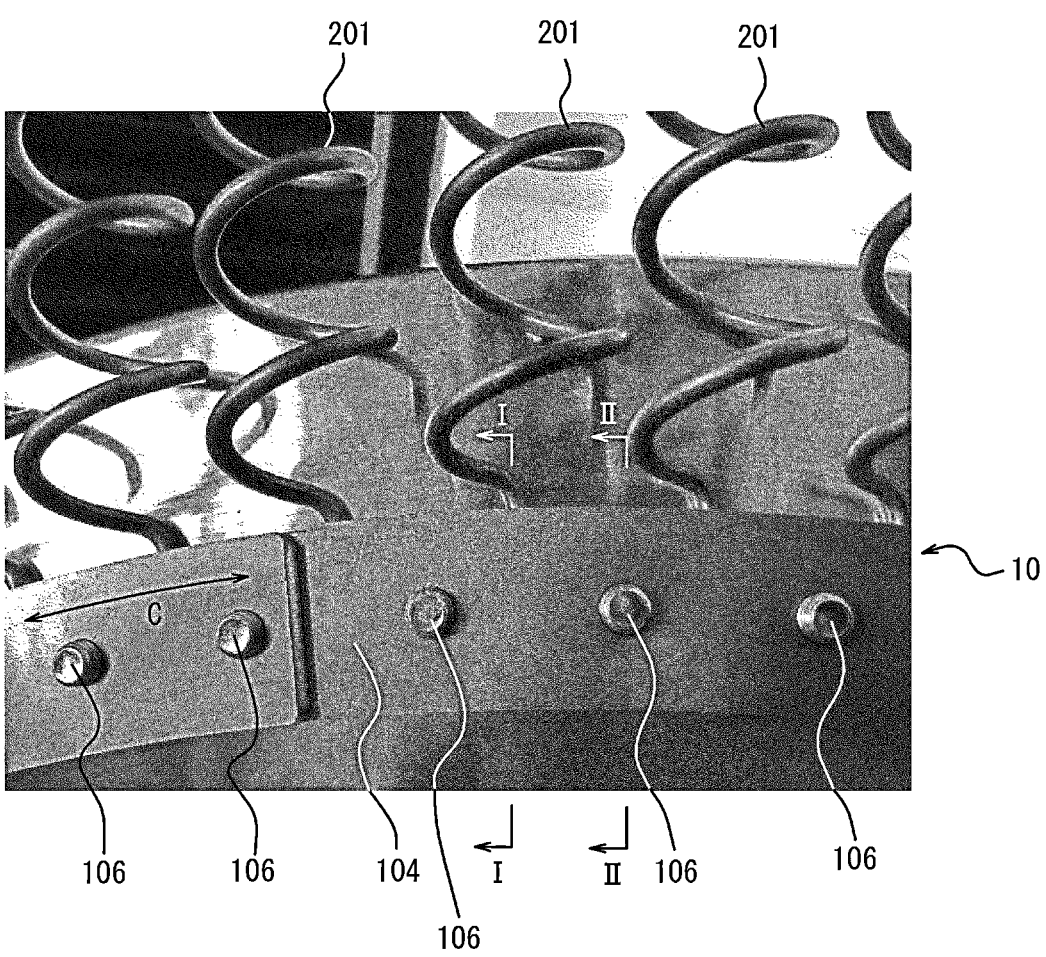
FIG. 5 is a schematic diagram illustrating an example of an aspect of latching the body springs on the rim member.
Figure 7:
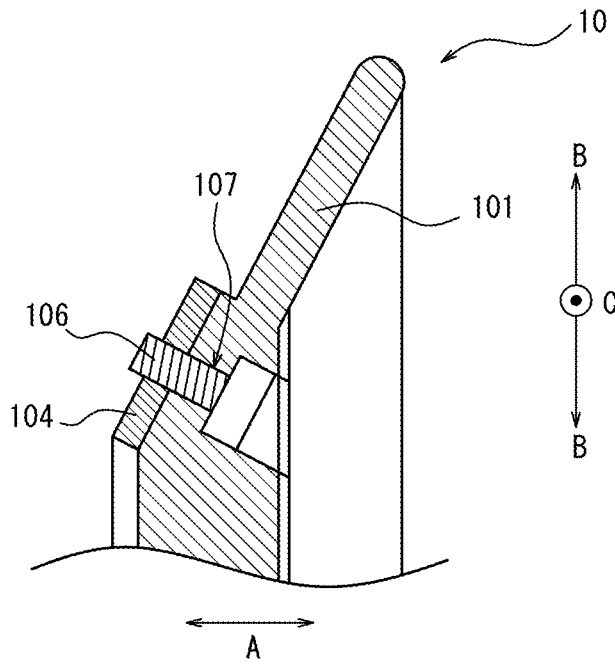
FIG. 7 is a cross sectional view along the line II-II of FIG. 5.

Referring to FIGS. 5 to 7, an aspect of latching the body springs 201 on the wheel portion 10 according to the present embodiment will be described in detail. One of the latch portions 203 provided at both ends of the body spring 201 is fitted into the first rim portion 101, and the other latch portion 203 is fitted into the second rim portion 102, thus causing the body spring 201 to be latched on the wheel portion 10 as the rim member. An example of a case in which one of the latch portions 203 is latched on the wheel portion 10 in a state fitted into the first rim portion 101 will be described here, while the other latch portion 203 is latched on the wheel portion 10 in a state fitted into the second rim portion 102 in the same manner.

FIG. 5 is a schematic diagram illustrating an example of an aspect of latching the body springs 201 to the wheel portion 10, in which a latched state of the body springs 201 to the wheel portion 10 is viewed from the inner side of the first rim portion 101 in the tire width direction A. FIG. 5 partially illustrates a part where ones of the latch portions 203 of the body springs 201 are latched. However, actually, ones of the latch portions 203 of the body springs 201 are latched as illustrated in FIG. 5 over the entire circumference of the first rim portion 101.

FIG. 6 is a cross sectional view taken on the line I-I of FIG. 5. Specifically, FIG. 6 is a cross sectional view of the first rim portion 101 at a point including the fit receiving portion 105. As illustrated in FIG. 6, the body spring 201 of the present embodiment is latched on the wheel portion 10 in a state where the latch portion 203 is fitted into the fit receiving portion 105 provided on the inner surface of the first rim portion 101 in the tire width direction A. In the present embodiment, the fit receiving portion 105 is configured as a hole into which the bent portion 203b of the latch portion 203 is insertable. More specifically, the fit receiving portion 105 of the present embodiment is configured as a bottomed hole. The length of the hole (depth of the hole) of the fit receiving portion 105 in an extending direction is preferably longer than the length of the bent portion 203b. As a result, the entire bent portion 203b can be inserted into the fit receiving portion 105, and the fitting state becomes more stable. However, the fit receiving portion 105 may be configured as a through hole, a bottomless hole.

The shape of cross section of the hole of the fit receiving portion 105 is not limited as long as the bent portion 203b is insertable thereinto, and may be, for example, an ellipse, an oval, a rectangle, a polygon, or the like. In order to latch the elastic deformable portion 202 more reliably, it is preferable that the shape and size of cross section of the hole are approximately the same as the shape and size of cross section of the bent portion 203b.

As illustrated in FIG. 6, the body spring 201 is arranged such that, in a state where the bent portion 203b has been inserted into the fit receiving portion 105, the elastic deformable portion 202 is positioned, except for at least part, at the outer side (upper side in FIGS. 6 and 7) of the annular first rim portion 101 in the tire radial direction B. In this state, the support member 104 is attached to the inner side (left side in FIGS. 6 and 7) of the first rim portion 101 in the tire width direction A. As illustrated in FIG. 6, the support member 104 is attached to such a position as to retain the bent portion 203b inserted into the hole of the fit receiving portion 105, i.e., such a position as to prevent the bent portion 203b from slipping out of the hole of the fit receiving portion 105. The support member 104 is preferably attached to such a position as to block the hole of the fit receiving portion 105 in a state of not inserting the body spring 201. In addition, as illustrated in FIG. 6, the support member 104 sandwiches the straight portion 203a of the latch portion 203 with the inner surface of the first rim portion 101 in the tire width direction A. In other words, the support member 104 is secured to the first rim portion 101 so as to sandwich the straight portion 203a of the latch portion 203 with the inner surface of the first rim portion 101 in the tire width direction A. In this way, the body spring 201 of the present embodiment is latched on the wheel portion 10 such that the straight portion 203a and the bent portion 203b of the latch portion 203 are sandwiched between the inner surface of the first rim portion 101 in the tire width direction A and the support member 104, in a state where the bent portion 203b of the latch portion 203 is fitted into the fit receiving portion 105.

The support member 104 of the present embodiment is attached to the first rim portion 101 using, for example, a bolt 106. FIG. 7 is a cross sectional view taken on the line II-II of FIG. 5. More specifically, FIG. 7 is a cross sectional view at a point including the bolt 106 for securing the support member 104 to the first rim portion 101. As illustrated in FIG. 7, the support member 104 is secured to the first rim portion 101 by the bolt 106. As illustrated in FIG. 5, the support member 104 may be secured to the first rim portion 101 at a position between two body springs 201. That is, in the first rim portion 101, one bolt hole 107 for securing the bolt 106 is formed between two fit receiving portions 105 adjacent in a tire circumferential direction C of the annular first rim portion 101. Thereby, it is possible to secure the support member 104 to the first rim portion 101 without interfering with latched positions of the body springs 201.

As illustrated in FIGS. 5 to 7, the bolt 106 may be provided such that a threaded end of the bolt 106 protrudes inward in the tire width direction A, relative to an inner surface of the support member 104 in the tire width direction A. The threaded end of the bolt 106, which protrudes inward in the tire width direction A relative to the inner surface of the support member 104 in the tire width direction A, may be used to secure a secured portion of a tread member 300 described below.

The support member 104 may be constituted of a single annular member or as a plurality of divided members that form an annular shape in their entirety. In such a case, the plurality of support members 104 may be arranged such that two support members 104 adjacent in the tire circumferential direction C contact or overlap each other at their ends in the tire circumferential direction C. Two support members 104 adjacent in the tire circumferential direction C may be arranged with leaving appropriate clearances in the tire circumferential direction C. In a case in which the support member 104 is constituted of the plurality of divided members, each member may have, for example, the shape of a sector.

A plurality of body springs 201 are arranged throughout in the tire circumferential direction C with leaving predetermined clearances in the tire circumferential direction C. One of the latch portions 203 of each of these plurality of body springs 201 is latched on the wheel portion 10 with the above-described latching aspect using the fit receiving portion 105 of the first rim portion 101. The other latch portion 203 of each of the body springs 201 is also latched on the wheel portion 10 with the above-described latching aspect using the fit receiving portion 105 of the second rim portion 102 in the same manner. In the present embodiment, one latch portion 203 and the other latch portion 203 of one body spring 201 may be fitted into the fit receiving portions 105 of the first rim portion 101 and the second rim portion 102 that are positioned on one straight line approximately parallel to the tire width direction A, with respect to the first rim portion 101 and the second rim portion 102. In other words, in the present embodiment, two latch portions 203 of one body spring 201 may be secured to the first rim portion 101 and the second rim portion 102 at the same position in the tire circumferential direction C. However, the two latch portions 203 of the one body spring 201 may be secured to the first rim portion 101 and the second rim portion 102 at different positions in the tire circumferential direction C.

The number and intervals in the tire circumferential direction C of the body springs 201 to be fitted into the first rim portion 101 and the second rim portion 102 may be determined as appropriate according to the size and weight of the tire 1, required properties of the grounding deformable portion 20, and the like. The number and intervals in the tire circumferential direction C of the bolts 106 used to attach the support members 104 to the first rim portion 101 and the second rim portion 102 may also be determined as appropriate. For example, the bolt 106 does not necessarily have to be attached to every space between two fit receiving portions 105 adjacent in the tire circumferential direction C as in the present embodiment.

Figure 8:
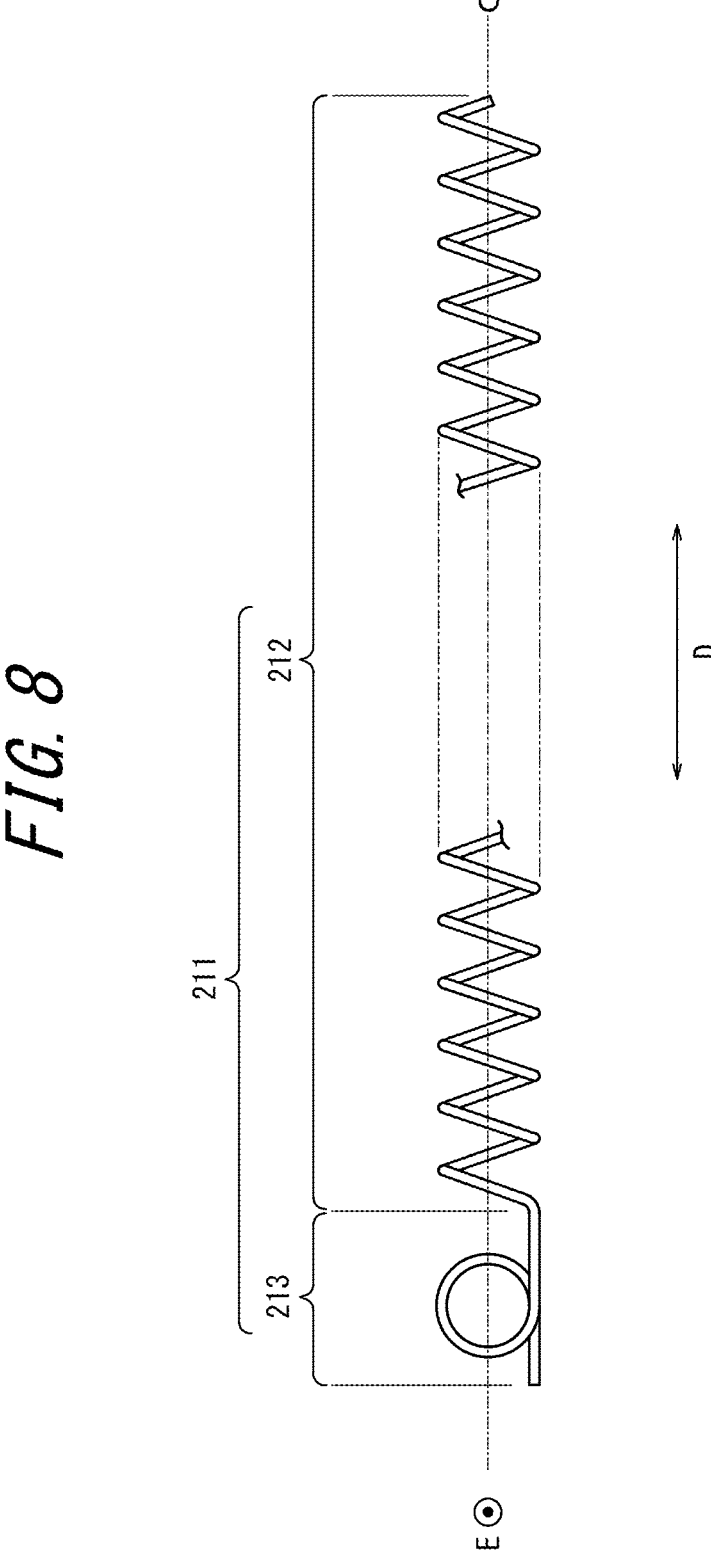
FIG. 8 is a schematic diagram of an example of an interlink spring that constitutes the grounding deformable portion of FIG. 2.

In the skeleton portion 2 of the tire 1 according to the present embodiment, the plurality of body springs 201, which are latched on the wheel portion 10 in this manner, are interlinked with the interlink springs 211 to form the grounding deformable portion 20. In other words, in the present embodiment, the interlink spring 211 functions as an interlink member to interlink adjacent body springs 201. FIG. 8 is a schematic diagram illustrating an example of the interlink spring 211 that constitutes the grounding deformable portion 20 of FIG. 2. In the present embodiment, as illustrated in FIG. 8, the interlink spring 211 includes an elastic deformable portion 212 and a limitation portion 213. The interlink spring 211 is disposed between two body springs 201 adjacent in the tire circumferential direction C, which are latched on the wheel portion 10. The interlink spring 211 is interlaced with the two body springs 201 so as to be interlinked with the body springs 201.

In the present embodiment, the elastic deformable portion 212 is constituted of a coil spring. The elastic deformable portion 212 that is made of a suitable material and has appropriate elasticity can be used according to the size and weight of a desired tire 1, required properties of the grounding deformable portion 20, and the like. It is preferable that the diameter of the coil spring constituting the elastic deformable portion 212 is close to the diameter of the coil spring constituting the elastic deformable portion 202 of the body spring 201. Here, the diameter of the coil spring is the diameter of a circumscribed circle in the case of viewing the coil spring from the axial direction, and the same applies hereinafter. The closer the diameter of the coil spring constituting the elastic deformable portion 212 is to the diameter of the coil spring constituting the elastic deformable portion 202 of the body spring 201, the more evenly force is applied to the grounding deformable portion 20 that is formed by interlinking the coil springs constituting the elastic deformable portions 202 with the coil springs constituting the elastic deformable portions 212 as described below. For example, both the diameter of the coil spring constituting the elastic deformable portion 202 and the diameter of the coil spring constituting the elastic deformable portion 212 can be 15 mm to 25 mm, e.g., 20 mm or the like.

In the present embodiment, the limitation portion 213 is provided at one end of the elastic deformable portion 212. No other mechanism is provided at the other end of the elastic deformable portion 212 where the limitation portion 213 is not provided. Thus, the elastic deformable portion 212 has an open shape at the other end. The limitation portion 213 limits displacement of the interlink spring 211, which is to be interlinked with the body springs 201, with respect to the body springs 201. The limitation portion 213 only has to limit displacement of the interlink spring 211 in at least one direction relative to the body springs 201. In this way, by limiting displacement of the interlink spring 211 relative to the body springs 201 by the limitation portion 213, in interlinking the interlink spring 211 with the body springs 201, as described with reference to FIGS. 9A and 9B below, the interlinked position of the interlink spring 211 is determined and secured. That is, the interlinked state of the interlink spring 211 with respect to the body springs 201 is positioned and secured. The limitation portion 213 has a different shape from the elastic deformable portion 212. That is, in the present embodiment, the limitation portion 213 has a different shape from a coil shape.

In the present embodiment, the limitation portion 213 is constituted of a member integral with the elastic deformable portion 212. As illustrated in FIG. 8, the limitation portion 213 of the present embodiment is an extending portion constituted of a part made by extending a material composing the elastic deformable portion 212 from one end of the elastic deformable portion 212. In the example illustrated in FIG. 8, the limitation portion 213 has a ring-shaped portion formed with a wire, which forms the elastic deformable portion 212, being bent into a ring shape. The ring-shaped portion is formed such that a direction intersecting with a central axis direction D parallel to a central axis O of the elastic deformable portion 212 is a central axis direction E. The ring-shaped portion of the limitation portion 213 may be of any size capable of limiting displacement of the interlink spring 211. For example, the ring-shaped portion of the limitation portion 213 may be configured to have a diameter of 0.5 to 1.0 times the diameter of the elastic deformable portion 212.

Figure 9A:
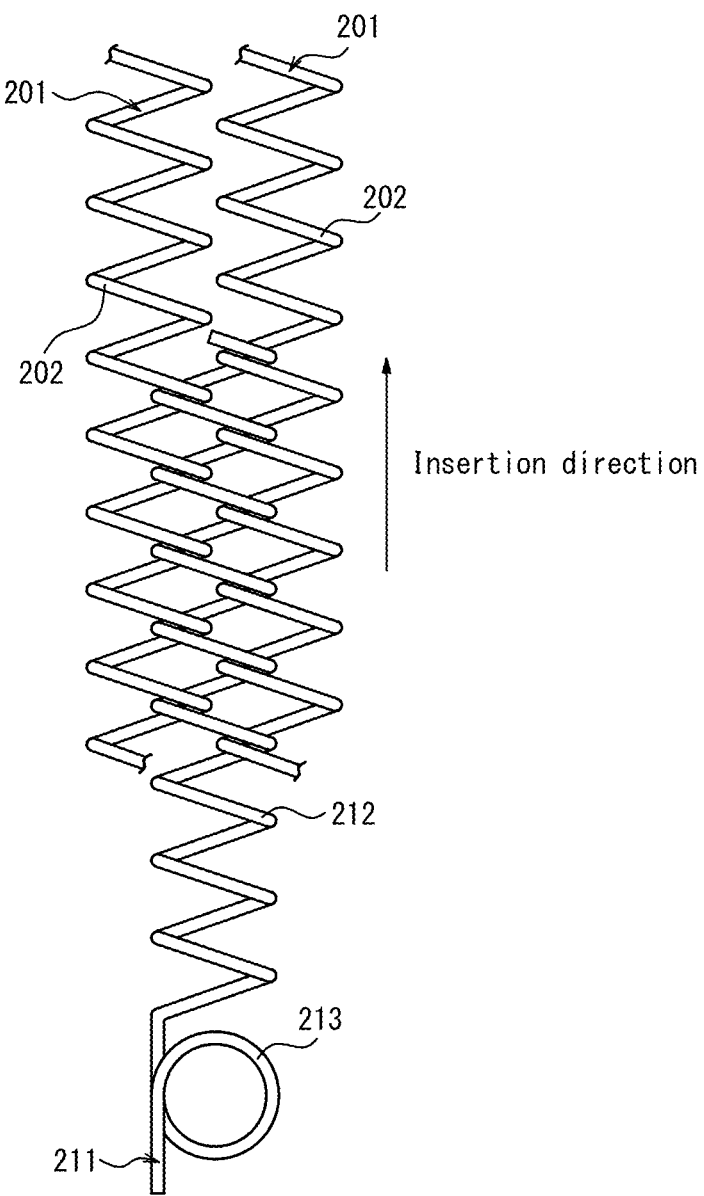
FIG. 9A is a schematic diagram for explaining an example of a method for joining the interlink spring to the body springs.
Figure 9B:
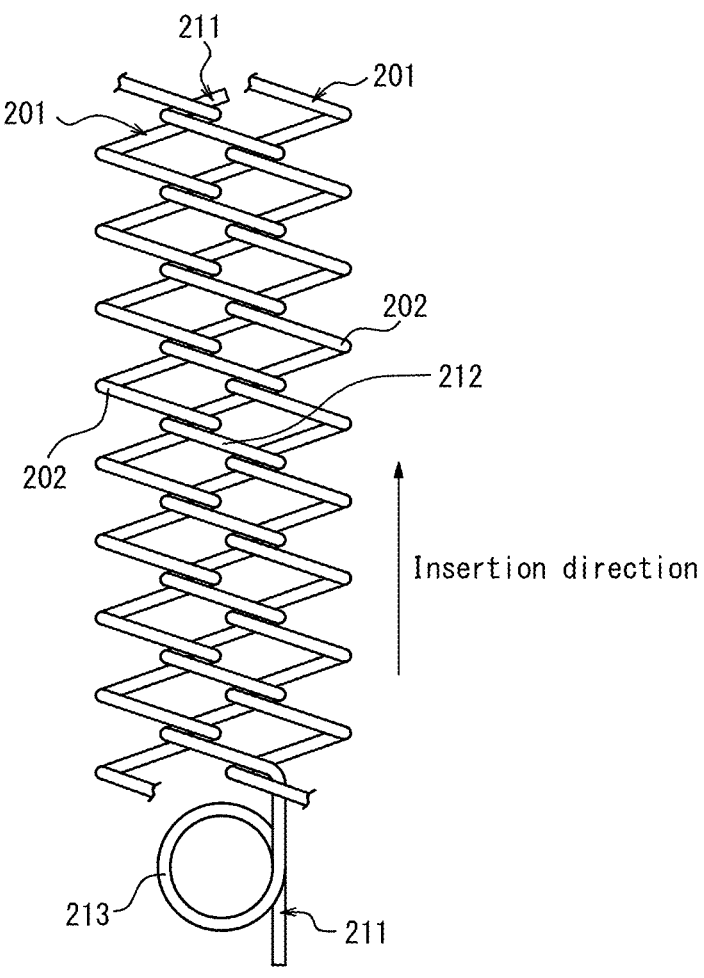
FIG. 9B is a schematic diagram for explaining an example of a method for joining the interlink spring to the body springs.

Here, the function of the limitation portion 213 will be described together with a method for interlinking the interlink spring 211 with the body springs 201. FIGS. 9A and 9B are schematic diagrams for explaining an example of the method for interlinking the interlink spring 211 with the body springs 201.

As illustrated in FIG. 9A, the interlink spring 211 is interlinked with two adjacent body springs 201 by hooking the elastic deformable portion 212 on the elastic deformable portions 202 of the body springs 201, which are latched on the wheel portion 10, in such a manner as to be interlaced with the two adjacent body springs 201. Specifically, the interlink spring 211 is interlinked with the body springs 201 so as to limit the relative displacement between the two body springs 201 adjacent in the tire circumferential direction C. At this time, the interlink spring 211 is gradually interlaced with the two adjacent body springs 201 by being inserted into the body springs 201 in such a manner as to move forward while rotating, from the side of the other end on which the limitation portion 213 is not provided.

As the entire elastic deformable portion 212 of the interlink spring 211 is interlaced with the body springs 201, as illustrated in FIG. 9B, the limitation portion 213 eventually comes into a state in contact with the body spring 201. The limitation portion 213, due to its shape, cannot be interlaced with the body springs 201. Therefore, the interlink spring 211 does not move in an insertion direction beyond the position at which the limitation portion 213 contacts the body spring 201. In particular, the interlink spring 211 does not move forward (move in the insertion direction) after the ring-shaped portion of the limitation portion 213 contacts the body spring 201, even if the interlink spring 211 is attempted to be moved forward while being rotated. In such a manner, the limitation portion 213 limits displacement of the interlink spring 211 in at least one direction relative to the body springs 201. In this manner, the limitation portion 213 positions and secures the interlinked state of the interlink spring 211 with respect to the body springs 201. In addition, the interlink spring 211 interlinked with the body springs 201 is prevented from coming off from the body springs 201.

It is preferable that at least one of the two ends of the interlink spring 211 is not secured to the wheel portion 10. In the present embodiment, neither of the ends of the interlink spring 211 is secured to the wheel portion 10. In other words, in the present embodiment, the interlink spring 211 is not secured at both ends. However, only one of the ends of the interlink spring 211 may be secured to the wheel portion 10. In this case, the other end of the interlink spring 211, which is opposite to the one end of the interlink spring 211 on which the limitation portion 213 is provided, is secured to the rim member.

In the present embodiment, all the body springs 201, which are latched on the wheel portion 10, are interlinked with each of two adjacent body springs 201 with the interlink springs 211. In the present embodiment, the skeleton portion 2 is configured in this manner. In other words, in the present embodiment, every body spring 201 of the grounding deformable portion 20 of the skeleton portion 2 is interlinked with two interlink springs 211, and every interlink spring 211 of the grounding deformable portion 20 of the skeleton portion 2 is interlinked with two body springs 201. Accordingly, the interlink springs 211 are each interlinked between two adjacent body springs 201, so even in the case of applying a load to the skeleton portion 2, the distance between the body springs 201 does not widen too much, and the function as the tire 1 can be easily maintained.

The interlink spring 211 that joins two body springs 201 may be inserted from the side of the first rim portion 101 toward the side of the second rim portion 102 or may be inserted from the side of the second rim portion 102 toward the side of the first rim portion 101, in the tire width direction A. It is preferable that half of the plurality of interlink springs 211 provided in the skeleton portion 2 are inserted from the side of the first rim portion 101 toward the side of the second rim portion 102 in the tire width direction A, and the other half thereof are inserted from the side of the second rim portion 102 toward the side of the first rim portion 101 in the tire width direction A. This means that the limitation portions 213 of the interlink springs 211 are evenly arranged on both sides of the skeleton portion 2 in the tire width direction A, thus easily striking a balance of the skeleton portion 2. This can also prevent the limitation portions 213 from being congested in only one side of the skeleton portion 2 in the tire width direction A. In particular, the plurality of interlink springs 211 are more preferably inserted such that two interlink springs 211 adjacent to each other in the tire circumferential direction C are inserted from different directions. This further facilitates striking a balance of the skeleton portion 2.

The skeleton portion 2 may also be provided with a connection member that connects the ring-shaped portions of the limitation portions 213 of the plurality of interlink springs 211. The connection member may be constituted of a wire, for example. For example, suppose that half of the plurality of interlink springs 211 are inserted from the side of the first rim portion 101 toward the side of the second rim portion 102 and the other half thereof are inserted from the side of the second rim portion 102 toward the side of the first rim portion 101. In this case, the limitation portions 213 of the interlink springs 211 inserted from the side of the first rim portion 101 toward the side of the second rim portion 102 are located on the side of the first rim portion 101 in the tire width direction A, and the limitation portions 213 of the interlink springs 211 inserted from the side of the second rim portion 102 toward the side of the first rim portion 101 are located on the side of the second rim portion 102 in the tire width direction A. In this case, the skeleton portion 2 may have two wires, that is, a wire for connecting the ring-shaped portions of the plurality of limitation portions 213 located on the side of the first rim portion 101 in the tire width direction A and a wire for connecting the ring-shaped portions of the plurality of limitation portions 213 located on the side of the second rim portion 102 in the tire width direction A.

The wire for connecting the ring-shaped portions of the plurality of limitation portions 213 located on the side of the first rim portion 101 is provided, for example, along the tire circumferential direction C so as to pass through central openings of all the ring-shaped portions of the plurality of limitation portions 213 located on the side of the first rim portion 101. Similarly, the wire for connecting the ring-shaped portions of the plurality of limitation portions 213 located on the side of the second rim portion 102 is provided, for example, along the tire circumferential direction C so as to pass through central openings of all the ring-shaped portions of the plurality of limitation portions 213 located on the side of the second rim portion 102. Provision of such wires can connect the limitation portions 213 of the plurality of interlink springs 211 each other. Thus, such wires limit displacement of the relative positional relationship between the limitation portions 213. As a result, the interlink springs 211 that are interlinked with the body springs 201 are further prevented from coming off from the body springs 201.

However, the connection member for connecting the ring-shaped portions of the limitation portions 213 of the plurality of interlink springs 211 need not necessarily be configured to pass through central openings of the ring-shaped portions of the plurality of limitation portions 213 as described above, and the limitation portions 213 may be connected to each other by any form. In this case, for example, the connection member may be secured to each of the ring-shaped portions of the plurality of limitation portions 213 to be connected, thereby connecting the ring-shaped portions of the plurality of limitation portions 213. By providing at least the wire for connecting the limitation portions 213 of the plurality of interlink springs 211, displacement of the relative positional relationship between the interlink springs 211 connected by the wire is limited.

In the above embodiment, it is described that the ring-shaped portion of the limitation portion 213 has the central axis direction E intersecting with the central axis direction D parallel to the central axis O of the elastic deformable portion 212, but the shape of the limitation portion 213 is not limited thereto. The limitation portion 213 may have any configuration capable of limiting displacement of the interlink spring 211 in at least one direction relative to the body springs 201.

Figure 10:
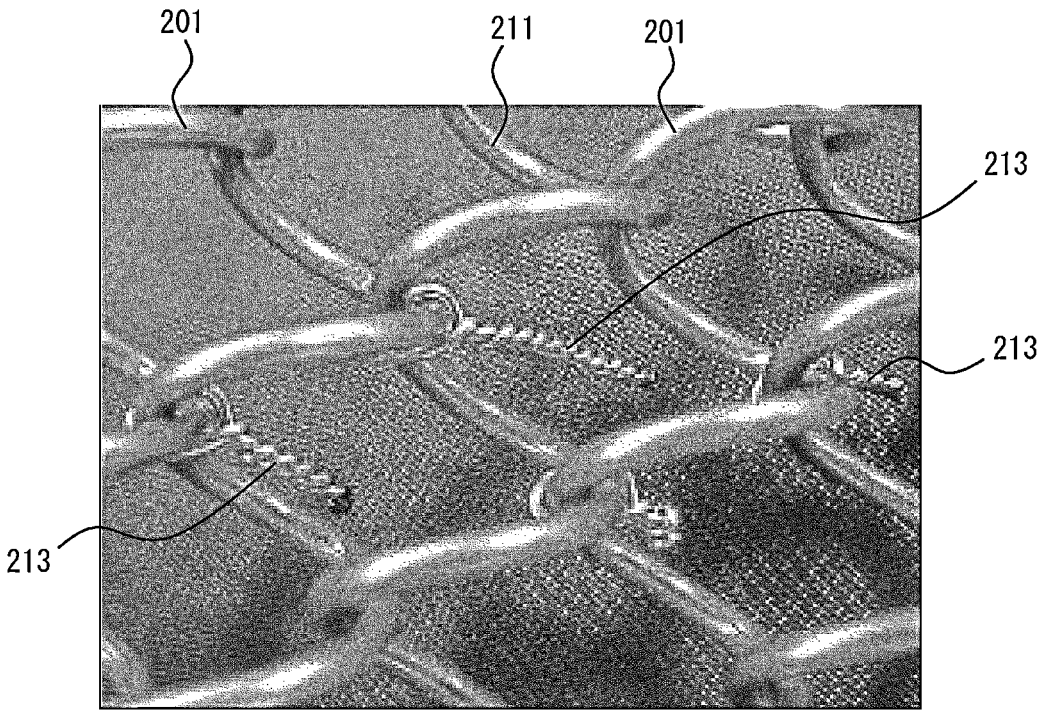
FIG. 10 is a schematic diagram illustrating a variation of a limitation portion.

In the present embodiment, the limitation portion 213 is constituted of a member integral with the elastic deformable portion 212, but the limitation portion 213 does not have to be constituted of a member integral with the elastic deformable portion 212. For example, as schematically illustrated in FIG. 10, a limitation portion 213 that is constituted of a member different from and independent of the interlink spring 211 may limit displacement of the interlink spring 211 relative to the body springs 201. In the example illustrated in FIG. 10, the limitation portion 213 is configured as a member different from and independent of the interlink spring 211, for limiting displacement of a contact point between the body spring 201 and the interlink spring 211 that are interlaced with each other.

The length of the interlink spring 211 may be determined as appropriate according to the size and weight of a desired tire 1, the required properties of the grounding deformable portion 20, and the like. The interlink spring 211 is preferably configured to have a length of the elastic deformable portion 212 that is shorter than the length of the elastic deformable portion 202 of the body spring 201. The interlink spring 211 preferably has a length such that the elastic deformable portion 212 extends throughout the tire width direction A. Thereby, the elastic deformable portions 202 of the body springs 201 are interlinked with the elastic deformable portions 212 of the interlink springs 211 in at least a grounding area in the tire width direction A.

<Tread Member 300>

As illustrated in FIG. 1, the tire 1 includes tread members 300 disposed on the outer periphery of the above-described skeleton portion 2.

Figure 11:
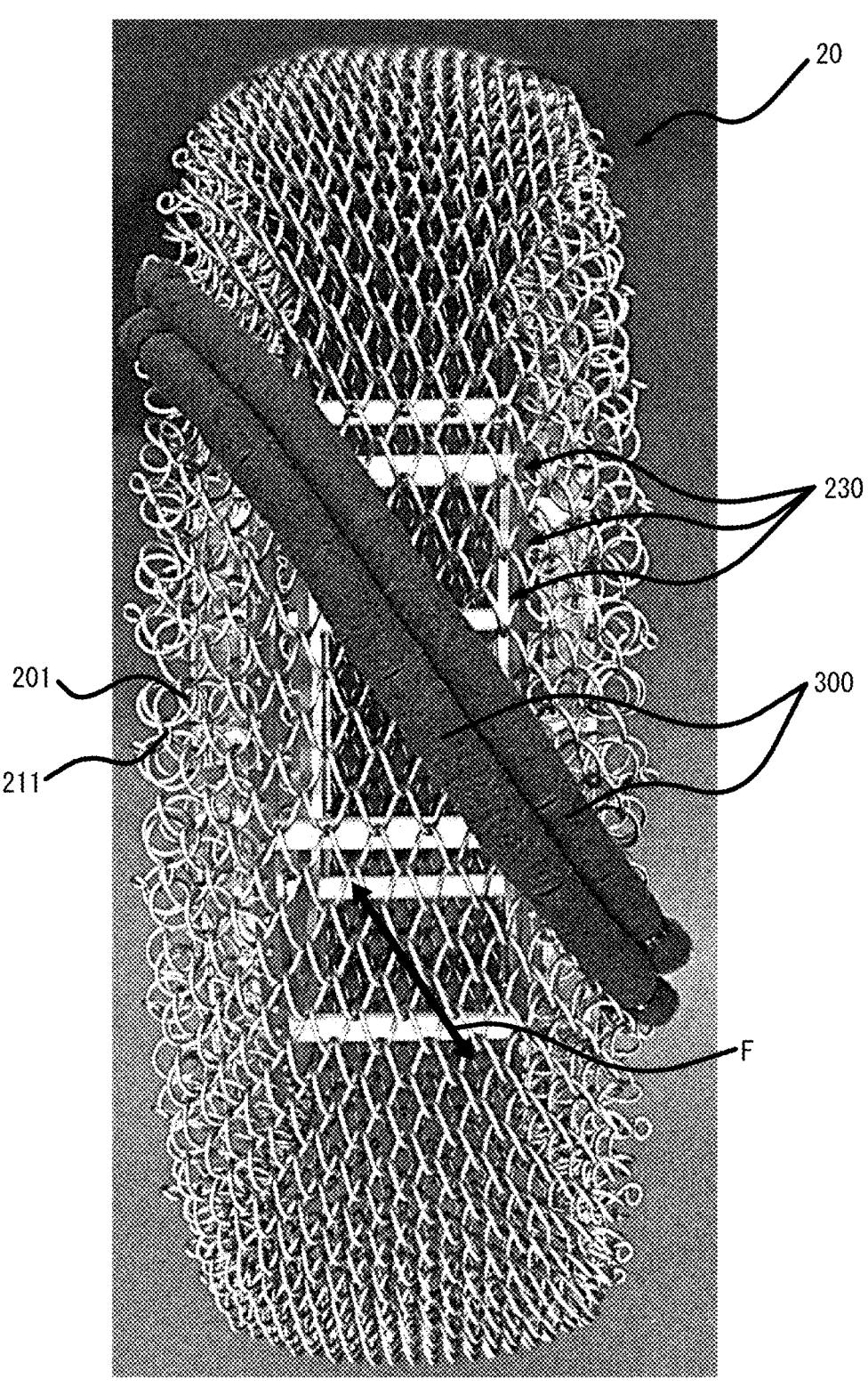
FIG. 11 is a diagram illustrating a state in which tread members are mounted on part of the skeleton portion.
Figure 12:
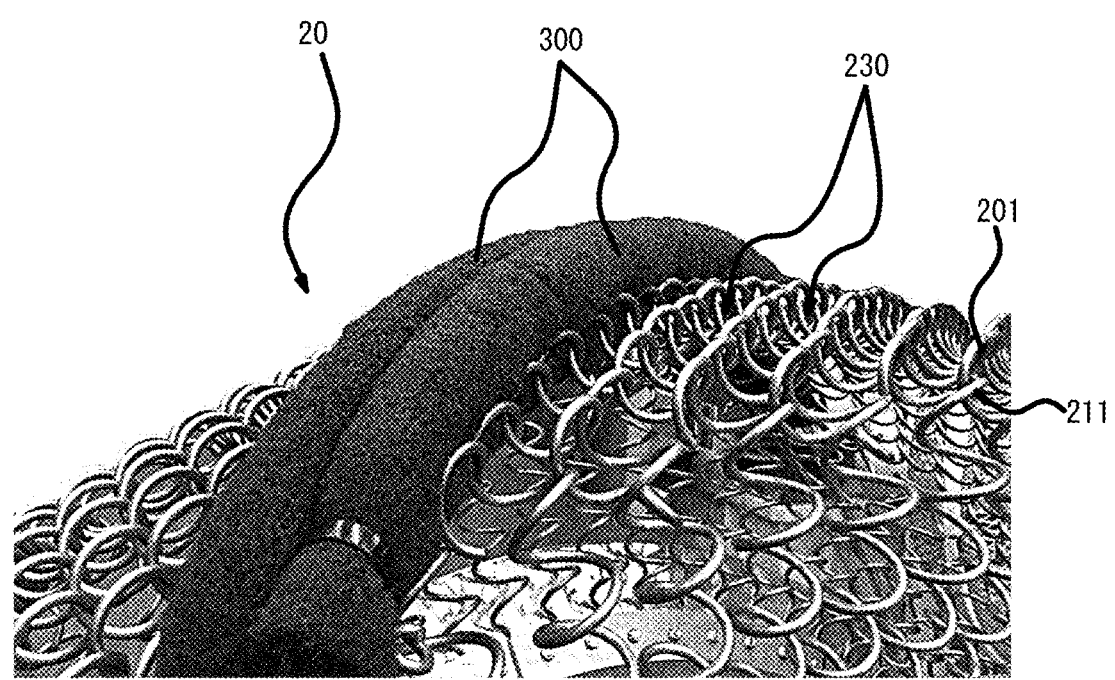
FIG. 12 is a diagram illustrating a state in which the tread members are mounted on part of the skeleton portion.

FIGS. 11 and 12 illustrate a state in which the tread members 300 are mounted on part of the skeleton portion 2. More specifically, FIG. 11 is a diagram of the skeleton portion 2 on part of which the tread members 300 are mounted, viewed from outside in the tire radial direction B. FIG. 12 is an enlarged diagram of part of the skeleton portion 2 on part of which the tread members 300 are mounted.

As illustrated in FIGS. 1, 11, and 12, the tread members 300 are mounted on at least a grounding area of the grounding deformable portion 20 including the body springs 201 and the interlink springs 211 of the skeleton portion 2. More specifically, the tread members 300 are mounted on the skeleton portion 2 so as to cover at least part of the outside of the grounding deformable portion 20 of the skeleton portion 2 in the tire radial direction B. Further, as in the present embodiment, the tread members 300 are preferably mounted on the skeleton portion 2 so as to cover the outside of the grounding deformable portion 20 of the skeleton portion 2 in the tire radial direction B, throughout the grounding deformable portion 20 in the tire width direction A. As in the present embodiment, the tread members 300 are preferably mounted on the skeleton portion 2 so as to cover the outside of the grounding deformable portion 20 of the skeleton portion 2 in the tire radial direction B, throughout the tire circumferential direction C. In particular, as in the present embodiment, the tread members 300 are preferably mounted so as to cover the entirety of both outsides in the tire width direction A and the entire outsides in the tire radial direction B of the body springs 201 and the interlink springs 211 that are positioned between the first rim portion 101 and the second rim portion 102, throughout the tire circumferential direction C, so as to prevent the body springs 201 and the interlink springs 211 from being exposed to the outside.

As illustrated in FIGS. 11 and 12, an outer surface of the skeleton portion 2 in the tire radial direction B is constituted of the body springs 201 and the interlink springs 211 that are interlaced with each other. Grooves 230 are formed on this outer surface of the skeleton portion 2 in the tire radial direction B with the body springs 201 and the interlink springs 211 interlaced with each other.

As described above, the positions in the tire circumferential direction C of both ends latched on the wheel portion 10 of the body spring 201 of the present embodiment are same. In other words, the plurality of body springs 201 that constitute the grounding deformable portion 20 of the present embodiment have a radial structure radially extending from the rotation axis of the tire 1, in a tire side view of the tire 1 along the rotation axis. Therefore, the interlink springs 211 interwoven with the body springs 201 also have a radial structure radially extending from the rotation axis of the tire 1, in the tire side view. Thus, in a case in which the body springs 201 and the interlink springs 211 have a radial structure radially extending in the tire side view, the grooves 230 are formed so as to extend in a direction intersecting with the tire width direction A and the tire circumferential direction C, as illustrated in FIGS. 11 and 12. Hereinafter, for explanatory convenience, a direction in which the grooves 230 extend is referred to as an "extending direction F" (see FIG. 11). In the present embodiment, a pitch of the coil springs of the elastic deformable portions 202 of the body springs 201 is almost equal to a pitch of the coil springs of the elastic deformable portions 212 of the interlink springs 211.

Figure 13A:
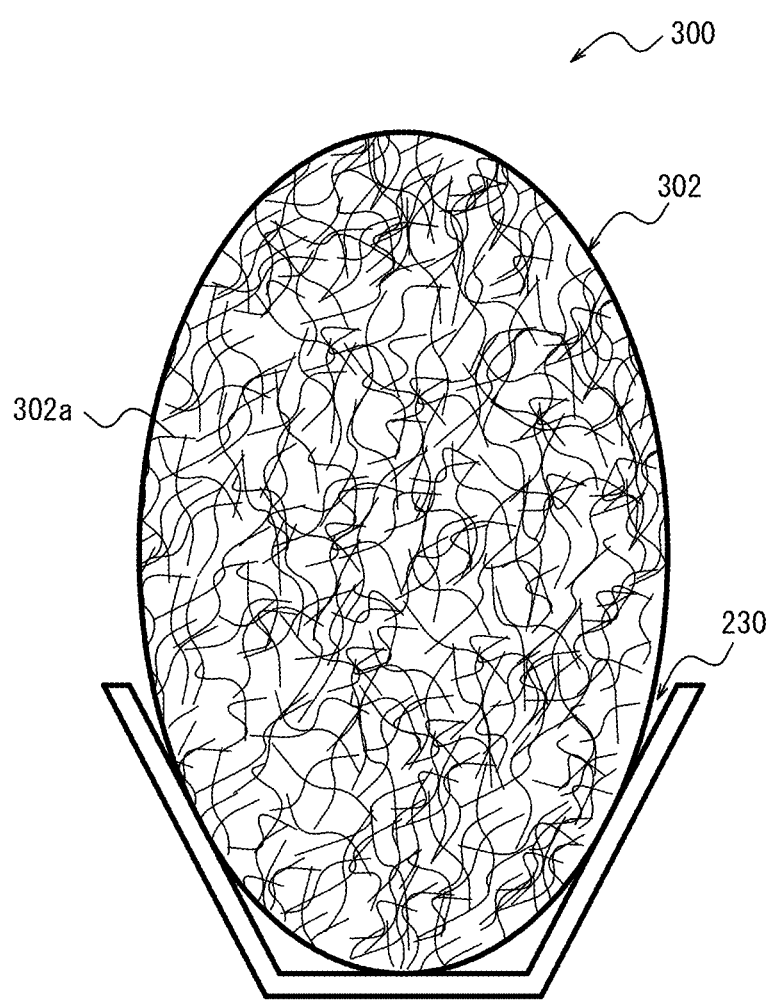
FIG. 13A is a schematic cross sectional view illustrating a state of mounting the tread member on the skeleton portion.

As illustrated in FIGS. 11 and 12, in the present embodiment, the tread members 300 are mounted in the grooves 230 formed with the body springs 201 and the interlink springs 211. FIG. 13A is a schematic cross sectional view illustrating a schematic cross section orthogonal to the extending direction F of the groove 230, of the tread member 300 mounted in the groove 230. As illustrated in FIG. 13A, the tread member 300 is mounted in such a manner that at least part of the tread member 300 is embedded in the groove 230. By mounting the tread member 300 in such a manner that at least part of the tread member 300 is embedded in the groove 230, the tread member 300 is prevented from falling out of the groove 230. In the present embodiment, only part of the tread member 300, that is, only a part of the tread member 300 (a lower portion in FIG. 13A) on an inner side in the tire radial direction B is mounted so as to be embedded in the groove 230, and a part of the tread member 300 (an upper portion in FIG. 13A) on an outer side in the tire radial direction B is exposed from the groove 230. In this case, vibrations and the like during driving can be suppressed. However, the tread member 300 may be mounted in such a manner that its entirety is embedded in the groove 230. In this case, the tread member 300 is prevented from falling out of the groove 230. In the present embodiment, as illustrated in FIG. 1, the tread members 300 are embedded in all the grooves 230 formed in the skeleton portion 2. The tread members 300 of the present embodiment are arranged so as to contact the tread members 300 that are adjacent in the tire circumferential direction C each other. However, the tread members 300 do not have to be embedded in all the grooves 230. For example, the tread members 300 may be embedded in only some of the grooves 230 formed in the skeleton portion 2.

In the present embodiment, it is preferable that the tread members 300 are detachably mounted on the skeleton portion 2. By detachably mounting the tread members 300 on the skeleton portion 2, the tread members 300 can be removed from the skeleton portion 2 and replaced, in a case in which the tread members 300 are worn out or the like.

As illustrated in FIG. 13A, the tread member 300 includes a nonwoven body 302. More specifically, the tread member 300 of the present embodiment illustrated in FIG. 13A is constituted of the nonwoven body 302.

Figure 13B:
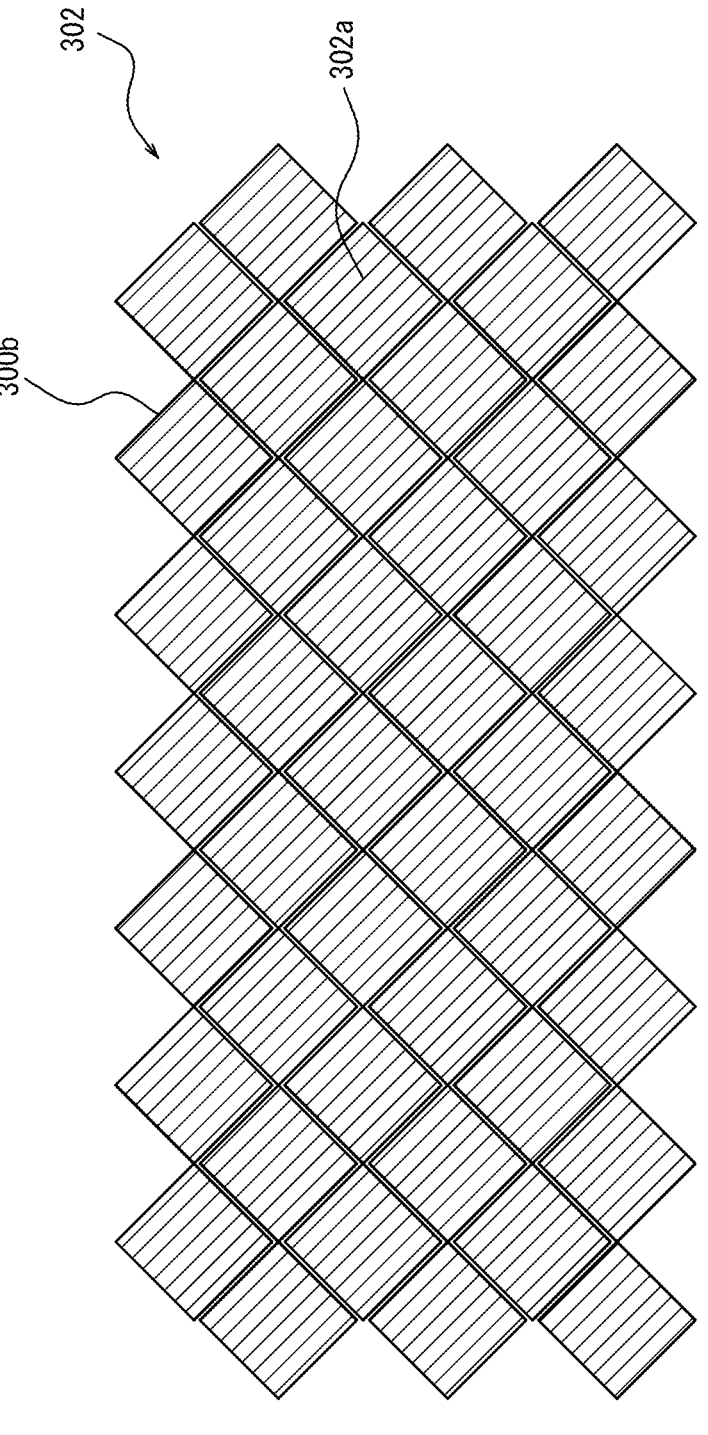
FIG. 13B is a diagram illustrating cross sectional profiles of metal fibers in a nonwoven body according to an embodiment of the disclosure.

FIG. 13B is a diagram illustrating a profile of each cross section (hereinafter, simply referred to as a "cross sectional profile") orthogonal to the longitudinal direction of a plurality of metal fibers 302*a* that form the nonwoven body 302. As illustrated in FIG. 13B, the nonwoven body 302 includes the plurality of metal fibers 302*a* with rectangle cross sectional profiles. More specifically, the fibers that form the nonwoven body 302 of the present embodiment are only the plurality of metal fibers 302*a* with rectangle cross sectional profiles. The term "rectangle" means a quadrangle (square or oblong) with all corners being right angles.

The cross sectional profile of the metal fiber 302*a* of the present embodiment is a rectangle, but the cross sectional profile of the metal fiber 302*a* is not limited to the rectangle. The cross sectional profile of the metal fiber 302*a* may be various convex polygonal shapes such as a triangle, parallelograms including a rhombus and the like, and a regular pentagon. The term "convex polygon" refers to a simple polygonal shape without selfintersection, in which no line segment connecting any two points in the interior or on the boundary of the polygon protrudes outside the polygon. As illustrated in FIG. 13B, by constituting a contact patch 300*b* (upper surface in FIG. 13B) of the tread member 300 using such metal fibers 302*a*, fine irregularities can be formed on the contact patch 300*b* of the tread member 300. FIGS. 14A, 14B, and 14C are each a conceptual diagram illustrating a state in which the contact patch 300*b* of the tread member 300 illustrated in FIG. 13B is grounded on a road surface on which fine irregularities are formed. In FIGS. 14A, 14B, and 14C, as an example of the road surface on which fine irregularities are formed, a road surface Y configured to be filled with angular particles X is illustrated. Examples of the road surface Y configured to be filled with angular particles X include a lunar surface covered with angular regolith with an average particle size of about 70 μm and a seafloor surface covered with gravel. FIGS. 14A, 14B, and 14C differ from each other only in the size of each cross sectional profile of the metal fibers 302*a* that constitute the contact patch 300*b* of the tread member 300. As illustrated in FIGS. 14A, 14B, and 14C, the fine irregularities formed on the contact patch 300*b* of the tread member 300 are likely to be engaged with the fine irregularities on the road surface Y. Therefore, by causing the contact patch 300*b* of the tread member 300 to have a configuration in which finer irregularities are formed by the metal fibers 302*a*, higher traction performance can be achieved during driving on the road surface Y on which fine irregularities are formed.

When assuming the road surface Y configured to be filled with angular particles X with an average particle size of α, it is preferable that a length (hereinafter, referred to as a "length of each side of the cross section") β of each side of the cross section of the metal fiber 302*a* with a square cross sectional profile satisfies (Formula 1) below. FIG. 14A illustrates a state of "β=√2α". FIG. 14B illustrates a state of "β=√2α/2". FIG. 14C illustrates a state of "β=√2α/4". When the length β of each side of the cross section of the metal fiber 302*a* is √2α/4 or more, the metal fiber 302*a* with a strength such that it is less likely to break or fracture even during driving on the road surface Y is likely to be achieved. When the length β of each side of the cross section of the metal fiber 302*a* is √2α or less, the irregularities on the contact patch 300*b* that are likely to be engaged with the irregularities on the road surface Y are likely to be achieved.

$$\sqrt{2}\alpha/4 \le \beta \le \sqrt{2}\alpha \qquad \text{(Formula 1)}$$

As an example, in a case in which the nonwoven body 302 of the present embodiment is used as the tread member 300 of a lunar rover, the regolith has an average particle size of about 70 μm, and the length β of each side of the cross section of the metal fiber 302*a* is thus preferably 24.7 μm≤β≤98.9 μm based on (Formula 1) above.

When assuming the road surface Y configured to be filled with angular particles X with an average particle size of α, it is preferable that a fiber equivalent diameter γ of the metal fiber 302*a* whose cross sectional profile is a convex polygonal shape satisfies (Formula 2) below. The fiber equivalent diameter γ means, when the cross-sectional area of the metal fiber 302*a* whose cross sectional profile is a convex polygonal shape is converted to a circular area, a diameter of the circle thereof. FIG. 14A illustrates a state in which the fiber equivalent diameter γ of the metal fiber 302*a* is close to "2α". FIG. 14B illustrates a state in which the fiber equivalent diameter γ of the metal fiber 302*a* is close to "α". FIG. 14C illustrates a state in which the fiber equivalent diameter γ of the metal fiber 302*a* is close to "α/2". When the fiber equivalent diameter γ of the metal fiber 302*a* is α/2 or more, the metal fiber 302*a* with a strength such that it is less likely to break or fracture even during driving on the road surface Y is likely to be achieved. When the fiber equivalent diameter γ of the metal fiber 302*a* is 2α or less, the irregularities on the contact patch 300*b* that are likely to be engaged with the irregularities on the road surface Y are likely to be achieved.

$$\alpha/2 \le \gamma \le 2\alpha \qquad \text{(Formula 2)}$$

As an example, in a case in which the nonwoven body 302 of the present embodiment is used as the tread member 300 of a lunar rover, the regolith has an average particle size of about 70 μm, and the fiber equivalent diameter γ of the metal fiber 302a is thus preferably 35 μm≤γ≤140 μm based on (Formula 2) above.

In this way, by constituting the contact patch 300b of the tread member 300 with the plurality of metal fibers 302a whose cross sectional profiles are each a convex polygonal shape, the traction performance during driving on the road surface on which fine irregularities are formed can be enhanced.

As described above, the tread member 300 of the present embodiment is constituted of the nonwoven body 302 including the plurality of metal fibers 302a with rectangle cross sectional profiles. Therefore, by constituting the contact patch 300b of the tread member 300 with a part including the metal fiber 302a with rectangle cross sectional profiles, the above-described traction performance can be achieved. More specifically, as described above, the fibers that form the nonwoven body 302 of the present embodiment are only the metal fibers 302a with rectangle cross sectional profiles. Therefore, the contact patch 300b of the tread member 300 may be constituted of any part of the nonwoven body 302.

The fibers that constitute the nonwoven body 302 may include fibers whose cross sectional profiles are each not a convex polygonal shape. However, of all the number of the fibers that constitute the nonwoven body 302, the percentage of the number of the metal fibers 302a whose cross sectional profiles are each a convex polygonal shape is preferably 70% or more, more preferably 80% or more, even more preferably 90% or more, and as in the present embodiment, most preferably 100%.

The metal fiber 302a is preferably made of austenite stainless steel or aluminum alloy. The fibers that constitute the nonwoven body 302 are preferably all made of metal regardless of their cross sectional profiles, and particularly preferably made of austenite stainless steel or aluminum alloy. Thus, by making all the fibers that constitute the nonwoven body 302 of austenite stainless steel or aluminum alloy, a configuration that is less likely to break even in an extremely low temperature environment can be achieved. In other words, by using such a nonwoven body 302, the tread member 300 that ensures durability in an extremely low temperature environment can be achieved. In particular, when the fibers that constitute the nonwoven body 302 are made of aluminum alloy, not only ensuring the durability as described above but also weight saving are likely to be achieved.

As illustrated in FIGS. 11 and 12, the tread member 300 of the present embodiment is configured in a rod shape so as to be able to be embedded along the groove 230. A through hole that passes through in the extending direction may be provided at a central portion of the rod-shaped tread member 300 of the present embodiment.

Furthermore, it is preferable that 50% or more of the number of the fibers out of all the fibers that constitute the nonwoven body 302 extend toward approximately equal directions. In such a way, the contact patch 300b on which approximately uniform irregularities are formed by the plurality of metal fibers 302a is likely to be achieved (see FIGS. 14A to 14C). In such a way, more stable traction performance can be achieved. It is more preferable that 80% or more of the number of the fibers out of all the fibers that constitute the nonwoven body 302 extend toward approximately equal directions. In such a way, the contact patch 300b on which more uniform irregularities are formed can be achieved. Hereinafter, the above-described "approximately equal direction" in which 50% or more of the number of the fibers out of all the fibers that constitute the nonwoven body 302 extend is referred to as a "main fiber direction", for explanatory convenience.

Here, as described above, the tread member 300 of the present embodiment is configured in a rod shape. In other words, the nonwoven body 302 that constitutes the tread member 300 of the present embodiment is configured in a rod shape. In the present embodiment, the above-described main fiber direction is a direction along a longitudinal direction of the entire rod-shaped nonwoven body 302. In such a way, by setting the cross sectional profile and the cross section dimensions of the metal fiber 302a as appropriate, a depressed portion formed between adjacent two metal fibers 302a is likely to be controlled to have a desired size. Therefore, irregularities with a size corresponding to that of the irregularities on the road surface are likely to be formed on the contact patch 300b of the tread member 300.

As illustrated in FIG. 13A, the cross sectional profile orthogonal to the longitudinal direction of the rod-shaped nonwoven body 302 that constitutes the tread member 300 of the present embodiment is oval but is not limited to this shape. The cross sectional profile orthogonal to the longitudinal direction of the rod-shaped nonwoven body 302 may be, for example, circular or gourd-shaped (see FIGS. 19A and 19B).

Figure 15:
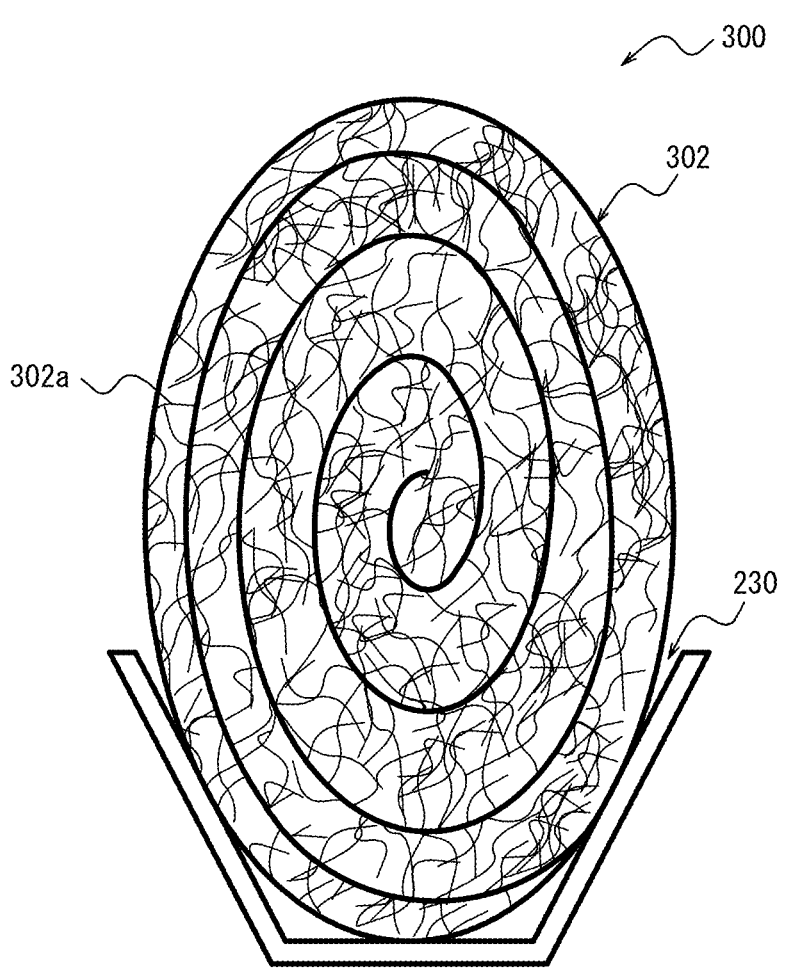
FIG. 15 is a diagram illustrating a variation of the tread member.

The tread member 300 is not limited to the example illustrated in FIG. 13A. FIG. 15 is a diagram illustrating a variation of the tread member 300. The tread member 300 illustrated in FIG. 15 is also constituted of the nonwoven body 302 as in the example illustrated in FIG. 13A. The nonwoven body 302 illustrated in FIG. 15 is also formed of the plurality of metal fibers 302a with rectangle cross sectional profiles. However, the nonwoven body 302 that constitutes the tread member 300 illustrated in FIG. 15 is not a clump of entangled metal fibers 302a but a sheet-shaped nonwoven fabric. As illustrated in FIG. 15, the sheet-shaped nonwoven fabric has a rounded rod shape and is at least partially embedded in the grooves 230 (see FIGS. 11 and 12) sectioned by the body springs 201 (see FIG. 9A and the like) and the interlink springs 211 (see FIG. 9A and the like). With such a configuration, the rod-shaped nonwoven body 302 of the tread member 300 can be easily achieved.

As illustrated in FIG. 15, the sheet-shaped nonwoven fabric as the nonwoven body 302 is preferably rounded such that a plurality of layers are laminated in the radial direction. In such a way, even if the outermost layer in the radial direction is worn or chipped during driving, another layer having a similar configuration appears on the inner side in the radial direction. Thus, performance deterioration of the tread member 300 is less likely to occur. Therefore, performance deterioration of the tread member 300 due to wear or chip can be suppressed to extend traveling distance.

Furthermore, the nonwoven fabric that forms the nonwoven body 302 is preferably made by a needle-punch method. The needle-punch method refers to a method for making a nonwoven fabric by simultaneously moving a plurality of (for example, thousands of) needles up and down and sticking them into a web of fibers in a sheet shape to tangle the fibers each other. That is, the nonwoven fabric that forms the nonwoven body 302 has preferably has a configuration in which the fibers mechanically tangle each other to be integrated. In such a way, it is possible to achieve the nonwoven body 302 that is less likely to break and is durable even in an environment with large temperature change or an environment with high cosmic ray exposure such as a lunar surface. The nonwoven fabric that forms the nonwoven body 302 is preferably not joined by adhesive or welding.

Figure 16:
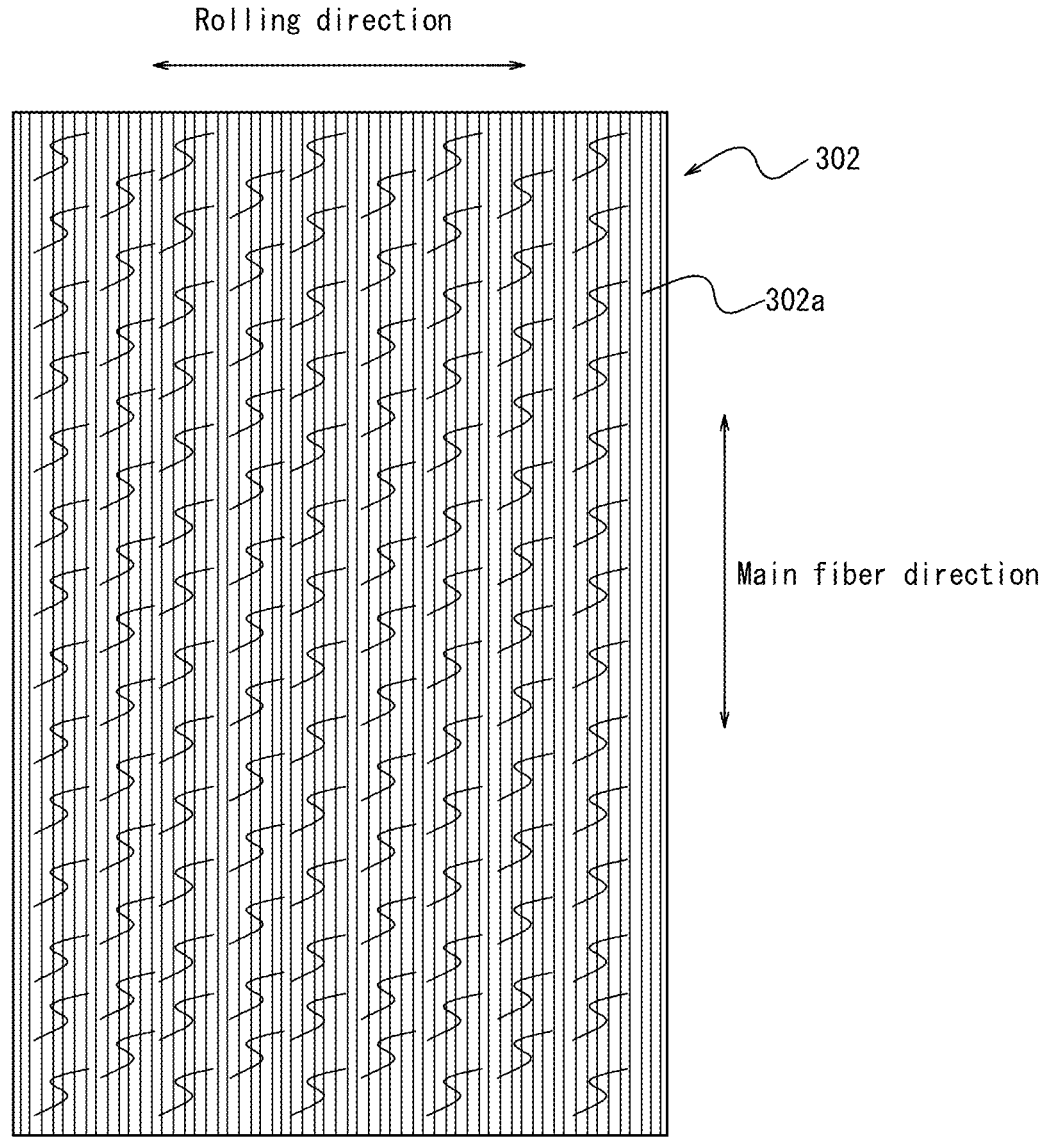
FIG. 16 is an explanatory diagram illustrating a method for forming a nonwoven body of the tread member illustrated in FIG. 15.

As described above, the main fiber direction of the fibers that form the nonwoven body 302 is preferably a direction along the longitudinal direction of the entire rod-shaped nonwoven body 302. Therefore, in a case where the rod-shaped nonwoven body 302 is formed by rounding the sheet-shaped nonwoven fabric, a direction (rounded direction) of rolling the sheet-shaped nonwoven fabric is preferably a direction orthogonal to the main fiber direction as illustrated in FIG. 16.

Figure 17:
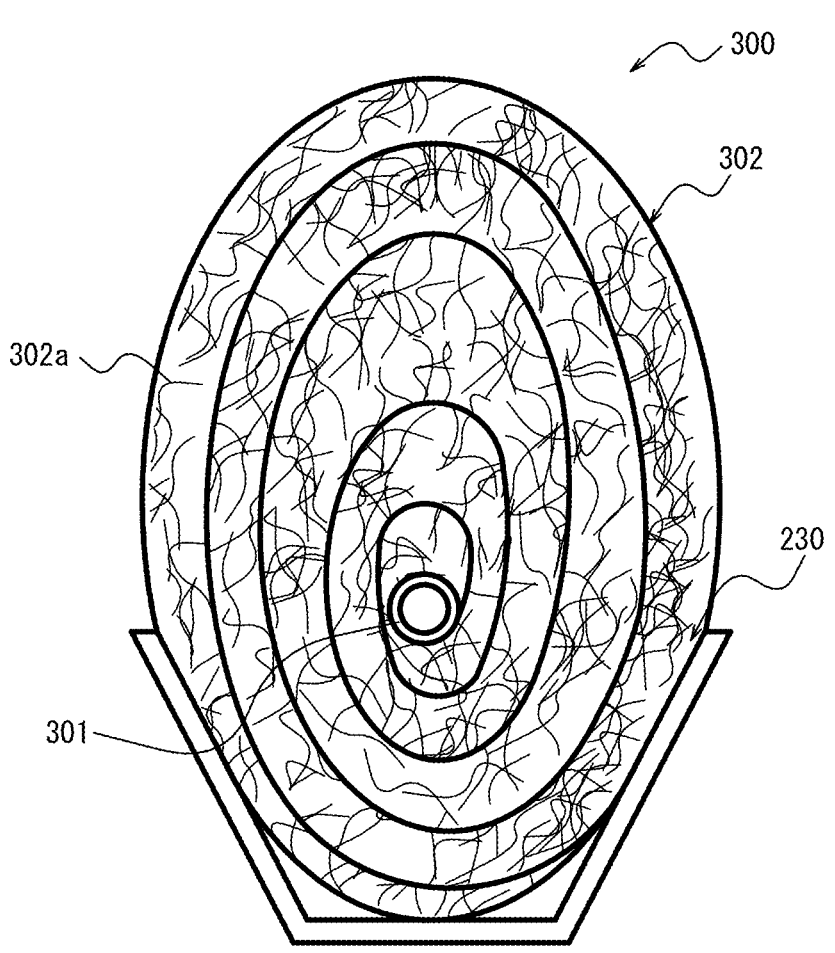
FIG. 17 is a diagram illustrating a variation of the tread member.

FIG. 17 is a diagram illustrating a variation of the tread member 300. The tread member 300 illustrated in FIG. 17 also includes a sheet-shaped nonwoven fabric as the nonwoven body 302 as in the example illustrated in FIG. 15. However, the tread member 300 illustrated in FIG. 17 differs from the example illustrated in FIG. 15, in that the tread member 300 illustrated in FIG. 17 includes, in addition to the nonwoven fabric as the nonwoven body 302, a rod-shaped core material 301 around which this nonwoven fabric is rolled. The core material 301 can be constituted of, for example, a coil spring having a fine wire diameter with a dense pitch.

Figure 18A:
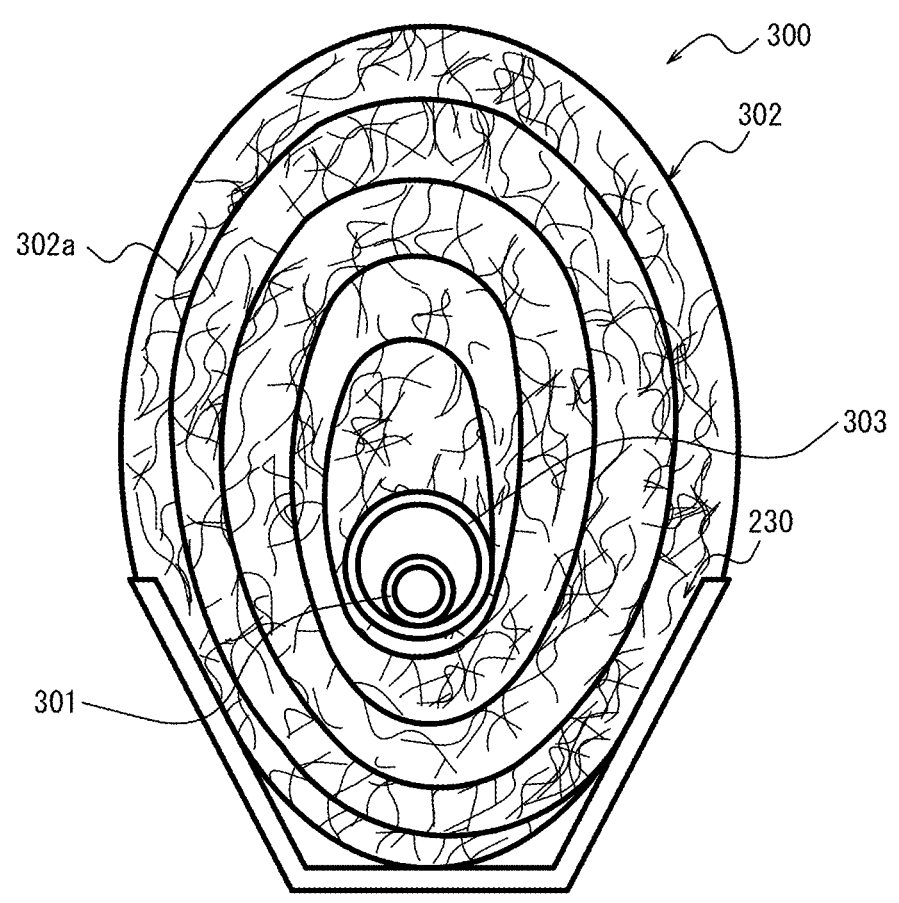
FIG. 18A is a diagram illustrating a variation of the tread member.
Figure 18B:
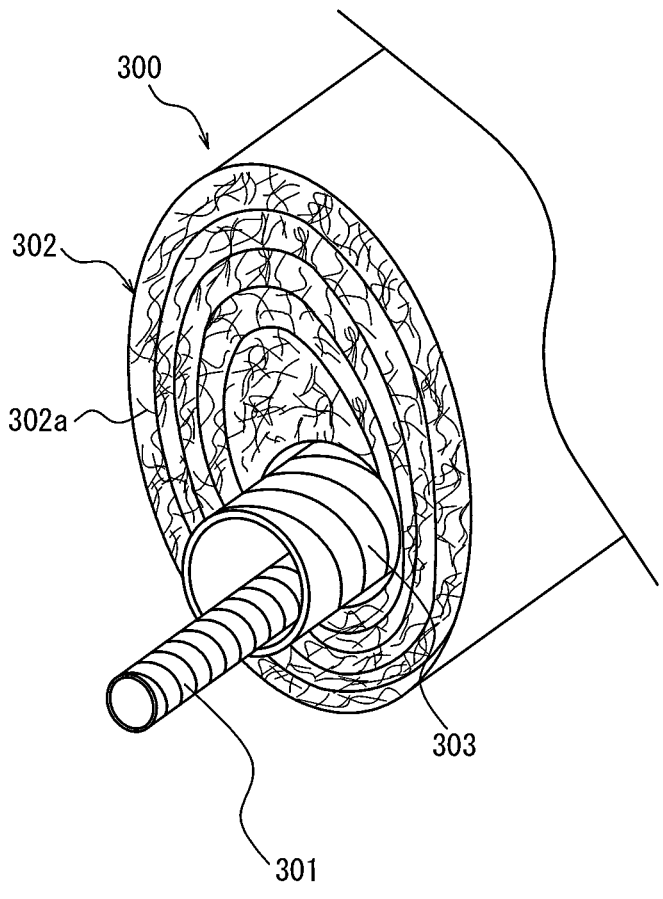
FIG. 18B is an explanatory diagram illustrating the structure of the tread member illustrated in FIG. 18A.

FIGS. 18A and 18B are diagrams illustrating a variation of the tread member 300. The tread member 300 illustrated in FIGS. 18A and 18B includes a sheet-shaped nonwoven fabric as the nonwoven body 302, a rod-shaped core material 301, and a reinforcement member 303 interposed between the core material 301 and the nonwoven fabric at the outside of this core material 301 in the radial direction. The reinforcement member 303 may have a cylindrical shape that surrounds the outside of the core material 301 in the radial direction. The reinforcement member 303 may be constituted of, for example, a coil spring with a dense pitch. The core material 301 is disposed inside the cylindrical reinforcement member 303. The provision of the reinforcement member 303 can suppress biting of the core material 301 into the nonwoven fabric as the nonwoven body 302, as compared with a case in which the reinforcement member 303 is not provided. In addition, the reinforcement member 303 protects the core material 301, thereby improving durability of the tread member 300. Furthermore, the reinforcement member 303 can store and retain heat transmitted from the wheel portion 10 and the like and heat emitted by the tread member 300, thereby suppressing supercooling of the tread member 300 in an extremely low temperature environment.

Figure 19A:
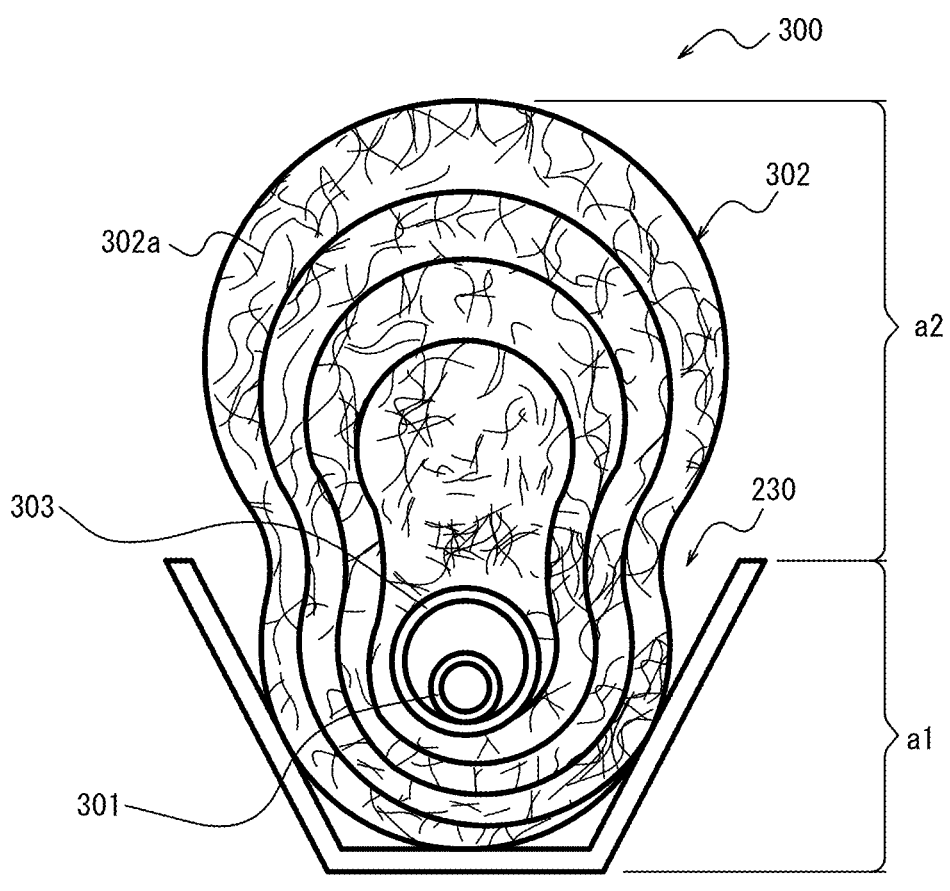
FIG. 19A is a diagram illustrating a variation of the tread member.
Figure 19B:
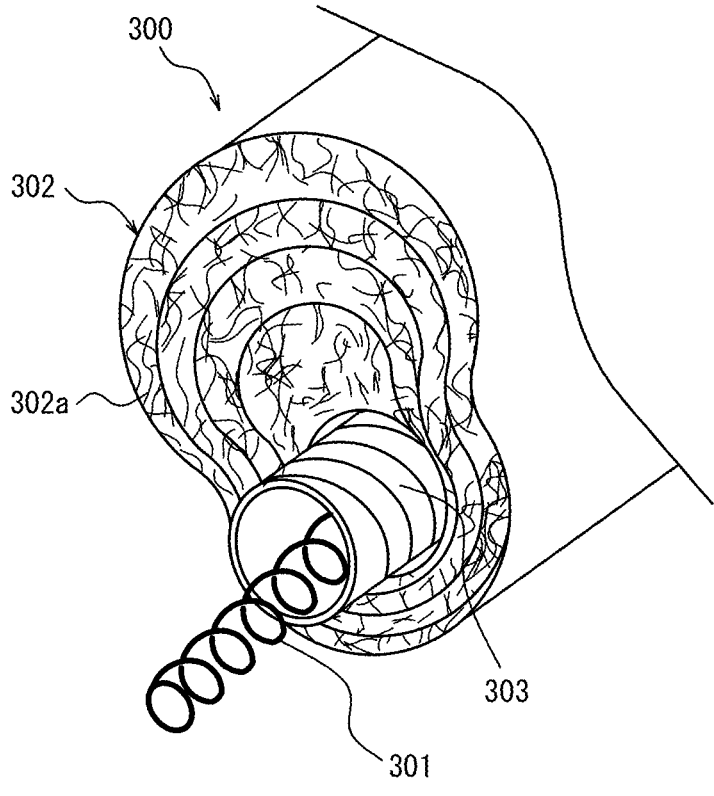
FIG. 19B is an explanatory diagram illustrating a structure of the tread member illustrated in FIG. 19A.

FIGS. 19A and 19B are diagrams illustrating a variation of the tread member 300. The tread member 300 illustrated in FIGS. 19A and 19B differs from the configuration illustrated in FIGS. 18A and 18B, in a cross sectional shape of the nonwoven fabric as the nonwoven body 302 when embedded in the groove 230. As illustrated in FIGS. 19A and 19B, the nonwoven body 302 of the tread member 300 may have a gourd shape in a cross sectional view. In this case, the tread member 300 has a secured area a1 to be embedded in the groove 230 and a grounding area a2 to be grounded. The grounding area a2 is provided outside the secured area a1 in the radial direction of the tire 1. In the tread member 300, a core material 301 and a reinforcement member 303 are provided in the secured area a1. As illustrated in FIGS. 19A and 19B, in the cross sectional view orthogonal to the longitudinal direction of the rod-shaped tread member 300, the width of the grounding area a2 is larger than the width of the secured area a1. The length of the grounding area a2 in the tire radial direction B is longer than the length of the secured area a1 in the tire radial direction B.

In the present embodiment, a method for securing the rod-shaped tread member 300 to the skeleton portion 2 is not particularly limited. The tread member 300 may be further provided with, for example, a secured portion for being secured to the skeleton portion 2. The secured portion may be constituted of, for example, sites extended from both ends of the above-described core material 301 (see FIG. 17 and the like). The secured portion may be secured to, for example, the above-described protruding threaded end of the bolt 106 (see FIG. 7). The provision of such a secured portion further prevents the tread member 300 from falling off from the skeleton portion 2.

Figure 20:
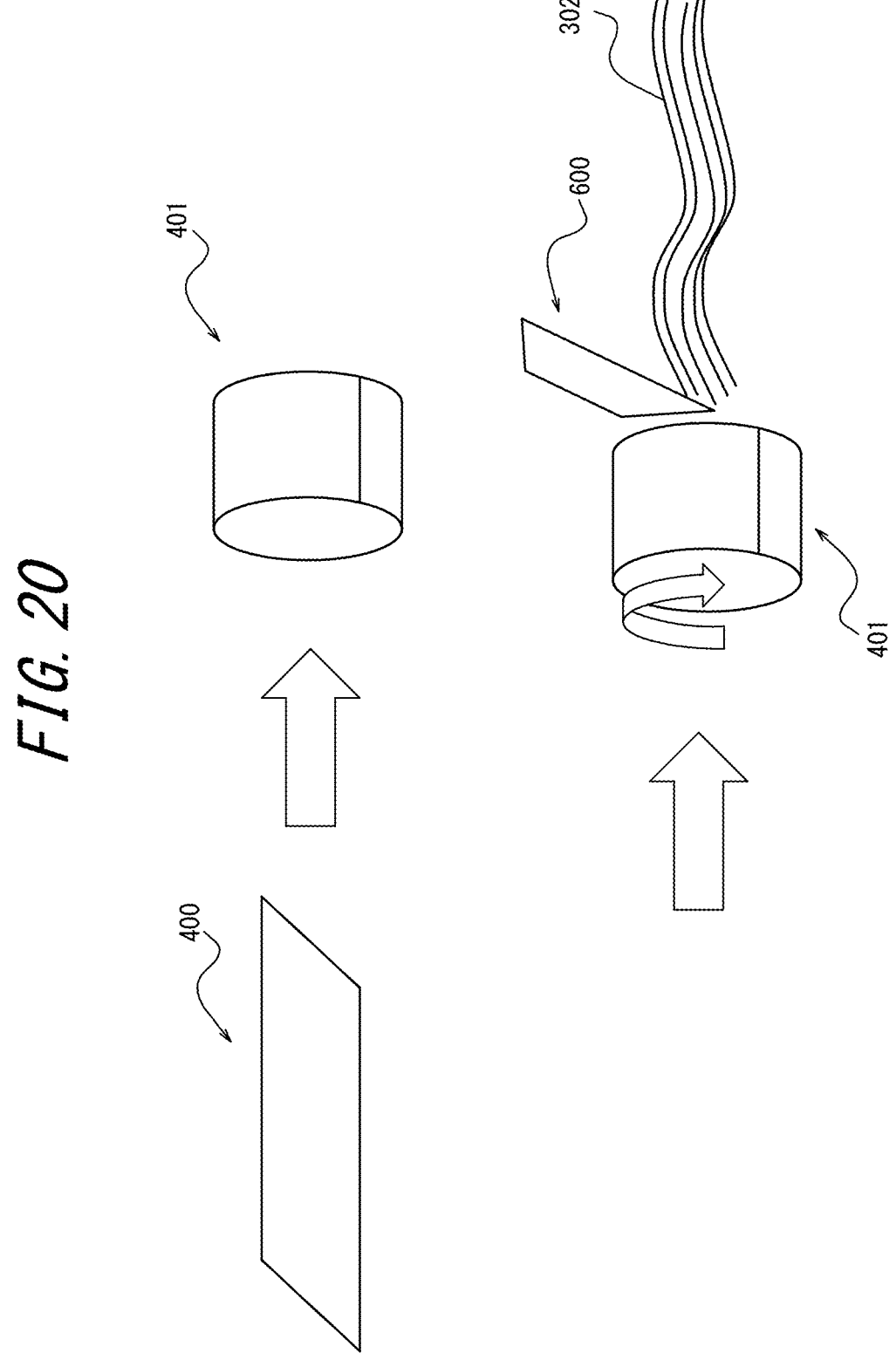
FIG. 20 is a diagram illustrating an example of a method for producing metal fibers each having a rectangle cross sectional profile.

Next, with reference to FIG. 20, it is described a method for producing the above-described metal fibers 302a with rectangle cross sectional profiles. As illustrated in FIG. 20, the metal fibers 302a with rectangle cross sectional profiles are obtained by rolling a thin metallic film 400, forming a roll body 401 of the thin metallic film 400, and then cutting the end face of this roll body 401 with a cutting edge 600. However, the production method illustrated in FIG. 20 is an example, and a method for producing the metal fibers whose cross sectional profiles are each a convex polygonal shape is not particularly limited.

As described above, according to the nonwoven body 302 including the plurality of metal fibers 302a with rectangle cross sectional profiles, which is described in the present embodiment, the tread member 300 that can improve the traction performance can be achieved. The cross sectional profile of the metal fiber 302a is not limited to a rectangle, and other convex polygonal shapes can achieve the tread member 300 that can improve the traction performance. The application of the nonwoven body 302 is not limited to the tread member 300 of the tire 1.

Figure 21:
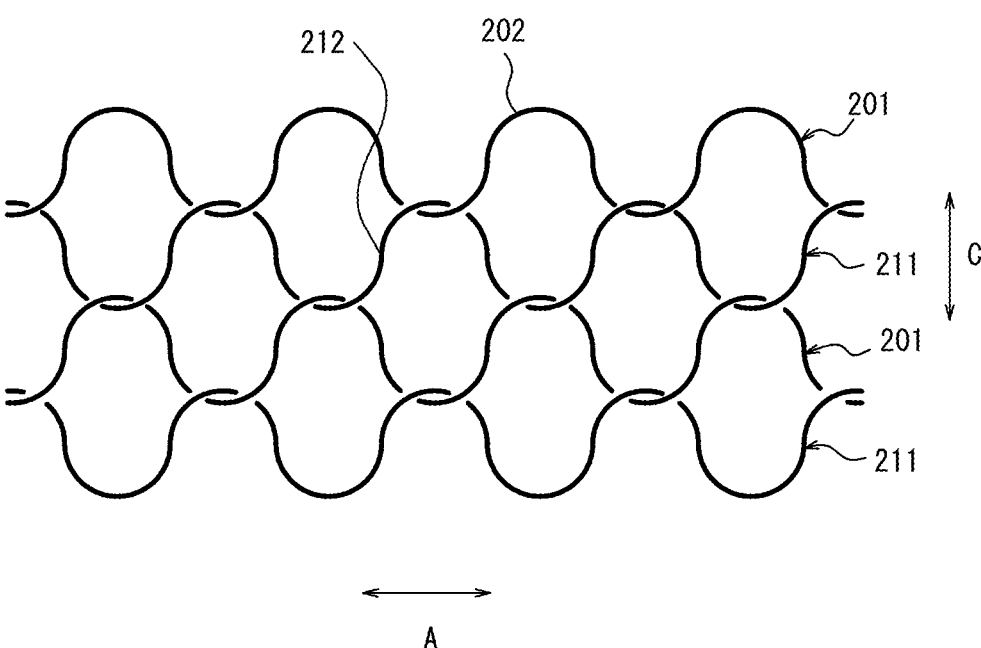
FIG. 21 is a schematic diagram illustrating a variation of the body springs and the interlink springs.

The nonwoven body and the tire according to the disclosure are not limited to specific configurations described in the above-described embodiment, and allow various variations, modifications, and combinations without departing from the scope of the claims. For example, in the above-described embodiment, the elastic deformable portion 202 of the body spring 201 and the elastic deformable portion 212 of the interlink spring 211 are each constituted of a coil spring, but the configuration is not limited to this. For example, as illustrated in FIG. 21, the elastic deformable portion 202 of the body spring 201 and/or the elastic deformable portion 212 of the interlink spring 211 may be each configured to include a two-dimensional (i.e., extending along approximately the same plane) corrugated metal wire portion, instead of the coil spring. FIG. 21 illustrates an example of a case in which the elastic deformable portions 202 and the elastic deformable portions 212 are each formed into a two-dimensional corrugated shape. The corrugated metal wire portion may be, for example, in the shape of a linked semicircle or a sinusoidal waveform. Even in this case, the body springs 201 and the interlink springs 211 can be interlinked by interlacing the corrugated wire portions of the body springs 201 and the corrugated wire portions of the interlink springs 211. In other words, the body springs 201 and the interlink springs 211 may have a configuration in which the grooves 230 (see FIG. 11 and the like) are not formed when the body springs 201 and the interlink springs 211 are interlaced with each other. Accordingly, the tread member 300 is also not limited to the configuration held in the groove 230. However, from a viewpoint of stably holding the tread members 300, it is preferably that the body springs 201 and the interlink springs 211 section the grooves 230 when the body springs 201 and the interlink springs 211 are interlaced with each other, as described in the above-described embodiment.

Figure 23:
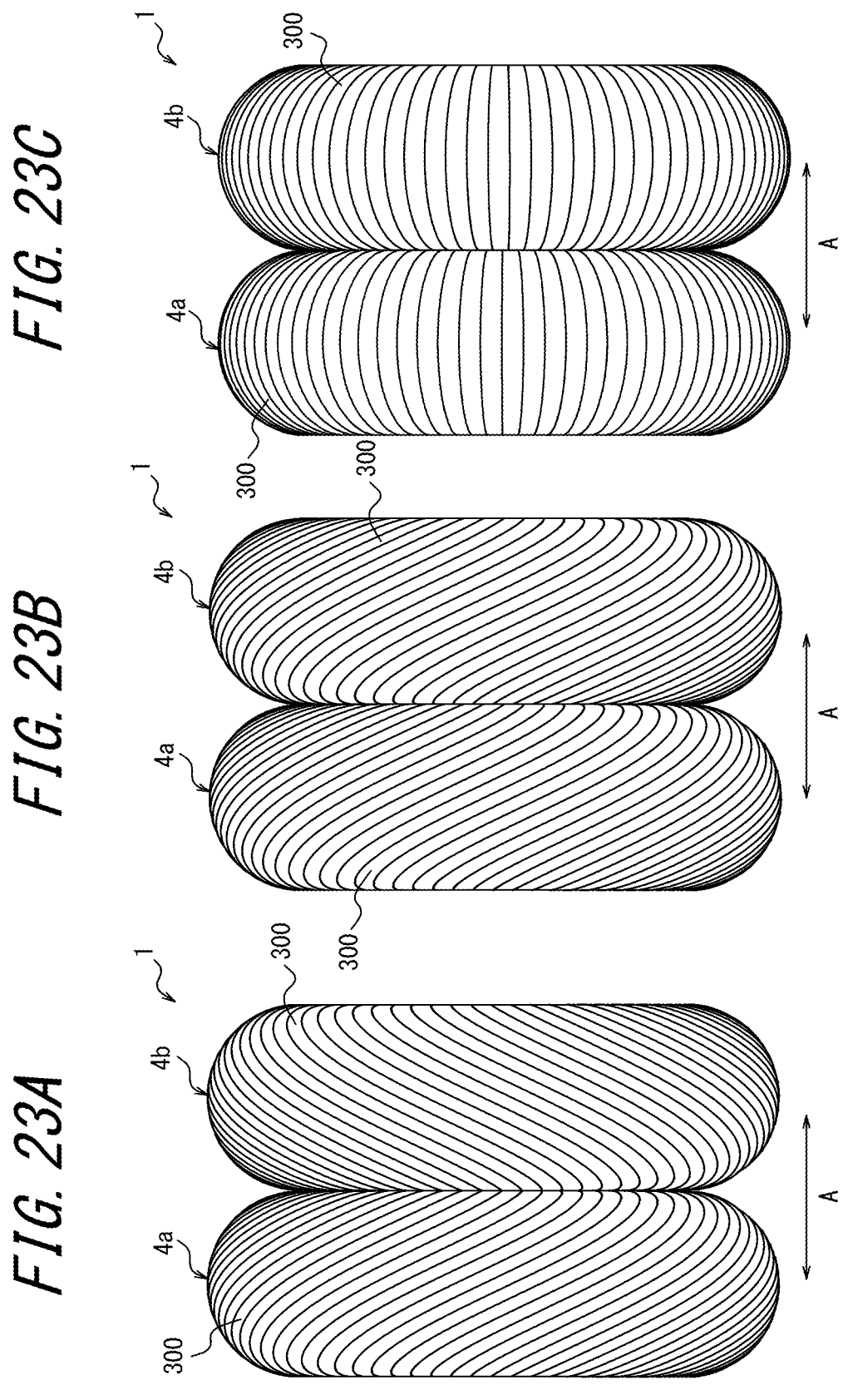
FIGS. 23A to 23C are each a diagram illustrating an example of the arrangement direction of the tread members at two different tread portions.

In the above-described embodiment, it has been described the tire 1 including the plurality of tread members 300 arranged without clearances in the tire circumferential direction C between two rim portions, but the configuration is not limited to this. As illustrated in FIGS. 22 to 24, the wheel portion 10 may include three or more rim portions. As illustrated in FIGS. 23A to 23C and 24, the tire 1 may have a configuration including a plurality of (two in FIGS. 23A to 23C and three in FIG. 24) tread portions at different positions in the tire width direction A.

FIGS. 23A to 23C each illustrate a tire 1 including two tread portions 4a and 4b at different positions in the tire width direction A. The tires 1 illustrated in FIGS. 23A to 23C differ from each other in the arrangement direction of the tread members 300 at the tread portions 4a and 4b. As illustrated in FIGS. 23A to 23C, the arrangement direction of the rod-shaped tread members 300 is not particularly limited. As in the above-described embodiment, even in the case of only one tread portion, the arrangement direction of the tread members 300 is not particularly limited. As illustrated in FIGS. 23A and 23B, the tread members 300 may extend in a direction inclined from the tire width direction A and the tire circumferential direction C in a tread surface view from the outer side in the tire radial direction B. As illustrated in FIG. 23C, the tread members 300 may extend along the tire width direction A in the tread surface view from the outer side in the tire radial direction B. In three tread portions 4a to 4c illustrated in FIG. 24, the arrangement direction of the tread members 300 is also not particularly limited.

INDUSTRIAL APPLICABILITY

The disclosure relates to a nonwoven body and a tire.

REFERENCE SIGNS LIST 1 tire
2 skeleton portion
4a, 4b, 4c tread portion
10 wheel portion (rim member)
20 grounding deformable portion
101 first rim portion
102 second rim portion
103 connection portion
104 support member
105 fit receiving portion
106 bolt
107 bolt hole
201 body spring
202 elastic deformable portion
203 latch portion
203a straight portion
203b bent portion
212 elastic deformable portion
213 limitation portion
230 groove
300 tread member
301 core material
302 nonwoven body
302a metal fiber
303 reinforcement member 400 thin metallic film
401 roll body
501, 502, 503 rim portion
600 cutting edge
A tire width direction
a1 secured area
a2 grounding area
B tire radial direction
C tire circumferential direction
D central axis direction of the elastic deformable portion of the interlink spring
E central axis direction of the ring-shaped portion of the limitation portion of the interlink spring
F extending direction of the groove
O central axis of the elastic deformable portion of the interlink spring
X particle
Y road surface

The invention claimed is:

1. A tire comprising:
a skeleton portion including a rim member, a plurality of body springs latched on the rim member, and a plurality of interlink springs interlaced with the body springs; and
a tread member disposed on at least an outer periphery of the skeleton portion, wherein
the tread member includes a nonwoven body comprising a plurality of metal fibers each having a cross section orthogonal to a longitudinal direction, the cross section having a profile that is convex polygonal,
the nonwoven body is a sheet-shaped nonwoven fabric, and
the nonwoven fabric is rounded to form a rod shape, is disposed on the outer periphery of the skeleton portion and is at least partially embedded in grooves sectioned by the body springs and the interlink springs.

2. The tire according to claim 1, wherein the nonwoven fabric is rounded to form the rod shape such that a plurality of layers are laminated in a radial direction.

3. The tire according to claim 1, wherein the metal fibers are made of austenite stainless steel or aluminum alloy.

4. The tire according to claim 1, wherein the nonwoven body is constituted only of the plurality of metal fibers.

5. The tire according to claim 1, wherein the plurality of metal fibers mechanically tangle each other.

6. The tire according to claim 1, wherein the profile of the cross section orthogonal to the longitudinal direction of each of the metal fibers is rectangle.

7. The tire according to claim 6, wherein the metal fibers are made of austenite stainless steel or aluminum alloy.

8. The tire according to claim 6, wherein the nonwoven body is constituted only of the plurality of metal fibers.

9. The tire according to claim 6, wherein the plurality of metal fibers mechanically tangle each other.

10. The tire according to claim 3, wherein the nonwoven body is constituted only of the plurality of metal fibers.

11. The tire according to claim 3, wherein the plurality of metal fibers mechanically tangle each other.

12. The tire according to claim 4, wherein the plurality of metal fibers mechanically tangle each other.

13. The tire according to claim 7, wherein the nonwoven body is constituted only of the plurality of metal fibers.

14. The tire according to claim 7, wherein the plurality of metal fibers mechanically tangle each other.

* * * * *